(12) United States Patent
Bishop

(10) Patent No.: US 10,768,642 B2
(45) Date of Patent: Sep. 8, 2020

(54) HIGH PRESSURE MANIFOLD, ASSEMBLY, SYSTEM AND METHOD

(71) Applicant: MGB OILFIELD SOLUTIONS, L.L.C., Houston, TX (US)

(72) Inventor: Mark Daniel Bishop, Katy, TX (US)

(73) Assignee: MGB OILFIELD SOLUTIONS, LLC, Katy, TX (US)

( * ) Notice: Subject to any disclaimer, the term of this patent is extended or adjusted under 35 U.S.C. 154(b) by 275 days.

(21) Appl. No.: 15/962,441

(22) Filed: Apr. 25, 2018

(65) Prior Publication Data

US 2018/0307255 A1    Oct. 25, 2018

Related U.S. Application Data

(60) Provisional application No. 62/617,164, filed on Jan. 12, 2018, provisional application No. 62/505,066, filed on May 11, 2017, provisional application No. 62/489,468, filed on Apr. 25, 2017.

(51) Int. Cl.
| | |
|---|---|
| *E21B 43/26* | (2006.01) |
| *G05D 16/20* | (2006.01) |
| *G05D 7/06* | (2006.01) |
| *G05D 16/04* | (2006.01) |
| *G05D 7/01* | (2006.01) |

(52) U.S. Cl.
CPC ........... *G05D 7/0664* (2013.01); *E21B 43/26* (2013.01); *G05D 7/01* (2013.01); *G05D 16/04* (2013.01); *G05D 16/206* (2013.01); *G05D 16/2073* (2013.01)

(58) Field of Classification Search
CPC ...... E21B 43/26; G05D 16/04; G05D 16/206; G05D 16/2073; G05D 7/01; G05D 7/0664

See application file for complete search history.

(56) References Cited

U.S. PATENT DOCUMENTS

| | | | | |
|---|---|---|---|---|
| 3,888,311 | A * | 6/1975 | Cooke, Jr. ................ | C09K 8/80 166/280.2 |
| 7,845,413 | B2 * | 12/2010 | Shampine ............. | E21B 43/267 166/369 |
| 8,151,885 | B2 * | 4/2012 | Bull ........................ | E21B 43/04 137/561 A |
| 8,813,836 | B2 | 8/2014 | Kajaria et al. | |
| 9,534,604 | B2 * | 1/2017 | Lopez ..................... | E21B 43/26 |
| 9,568,138 | B2 | 2/2017 | Arizpe et al. | |
| 9,605,525 | B2 | 3/2017 | Kajaria et al. | |
| 10,119,380 | B2 * | 11/2018 | Joseph .................... | E21B 43/26 |
| 10,289,125 | B2 * | 5/2019 | Imel ........................ | F04B 47/02 |
| 10,466,719 | B2 * | 11/2019 | Kibler .................... | E21B 43/26 |

(Continued)

*Primary Examiner* — Daniel P Stephenson
(74) *Attorney, Agent, or Firm* — The Compton Law Firm, P.C.; Scott D. Compton

(57) ABSTRACT

The present application is directed to a manifold system for low pressure and high pressure fluids. The manifold system may include one or more manifold sub-assemblies that may be assembled together, separated apart and replaced as desired. In oil and gas hydraulic fracturing operations, each manifold sub-assembly includes two or more low pressure fluid lines and two or more high pressure fluid lines for fluidly communicating with hydraulic fracturing pumps. High pressure fluid may exit the manifold system via a single line or multiple lines.

19 Claims, 28 Drawing Sheets

(56) References Cited

U.S. PATENT DOCUMENTS

| | | | |
|---|---|---|---|
| 2009/0194273 A1* | 8/2009 | Surjaatmadja | E21B 43/26 166/250.1 |
| 2012/0085541 A1* | 4/2012 | Love | E21B 43/26 166/308.1 |
| 2012/0181013 A1 | 7/2012 | Kajaria et al. | |
| 2012/0235829 A1* | 9/2012 | Adnan | E21B 41/00 340/854.9 |
| 2013/0242688 A1* | 9/2013 | Kageler | B01F 7/00233 366/139 |
| 2014/0277772 A1* | 9/2014 | Lopez | F04D 15/029 700/282 |
| 2015/0000766 A1 | 1/2015 | Arizpe et al. | |
| 2015/0129210 A1* | 5/2015 | Chong | F28D 21/001 166/280.1 |
| 2016/0376864 A1 | 12/2016 | Roesner et al. | |
| 2017/0122060 A1* | 5/2017 | Dille | E21B 43/26 |
| 2017/0123437 A1 | 5/2017 | Boyd et al. | |
| 2018/0298731 A1* | 10/2018 | Bishop | E21B 41/0085 |
| 2018/0307255 A1* | 10/2018 | Bishop | G05D 7/0664 |
| 2019/0383125 A1* | 12/2019 | Koricanek | E21B 43/26 |

* cited by examiner

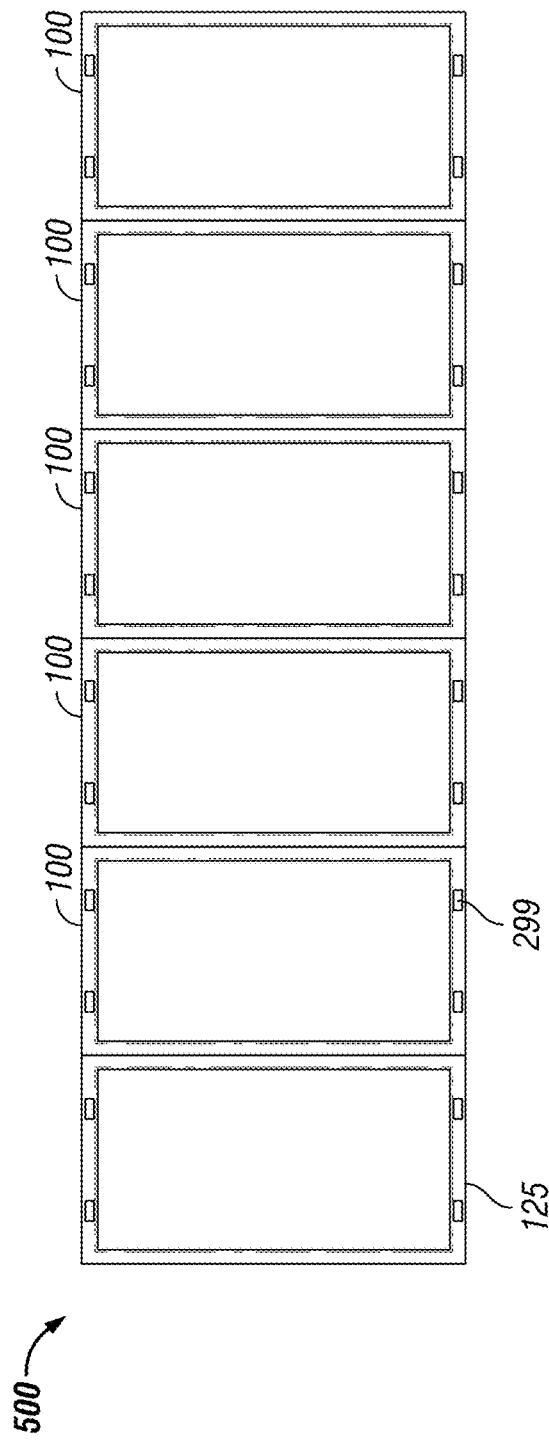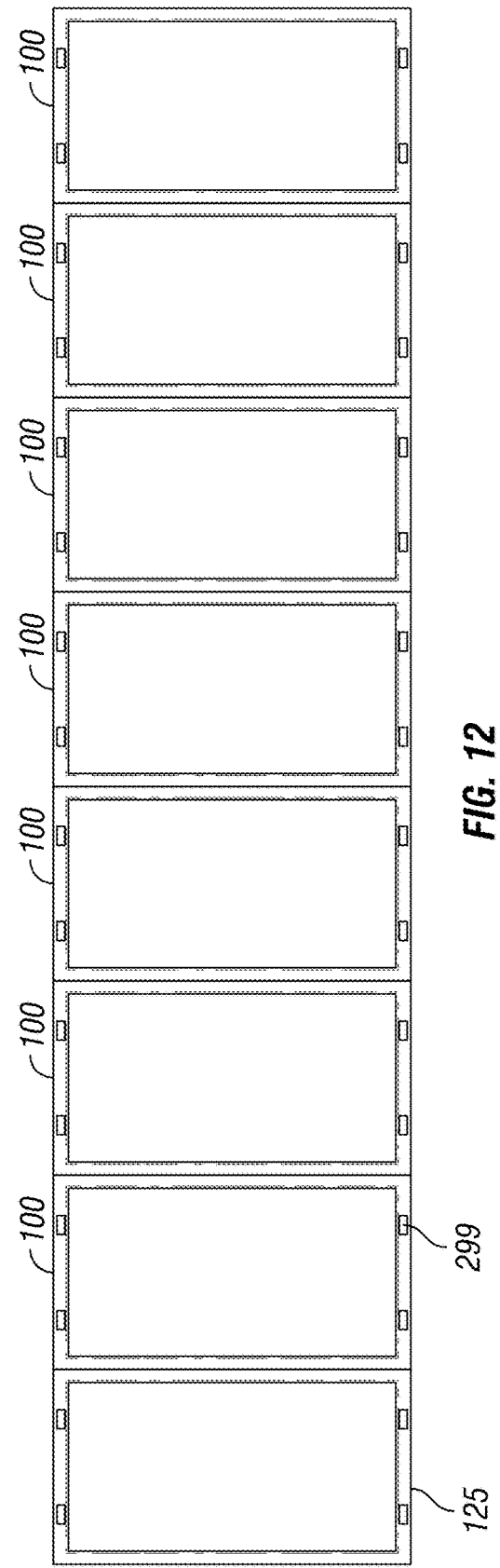

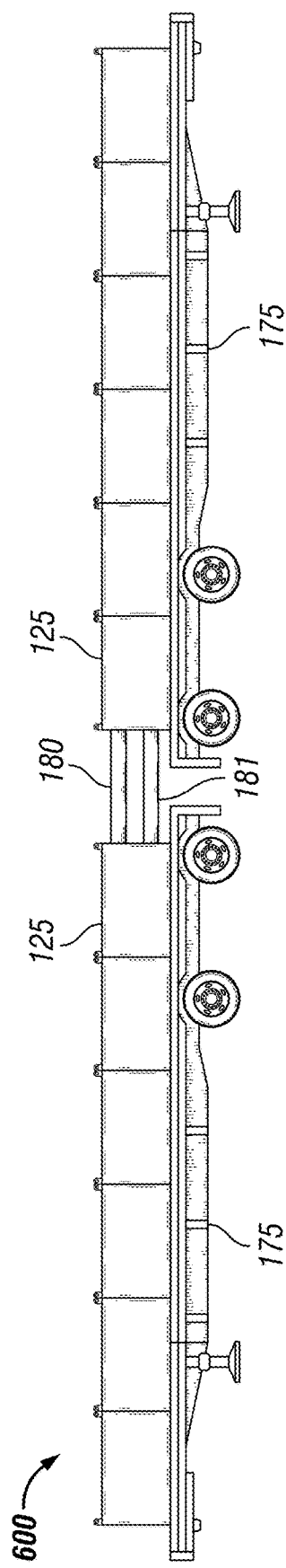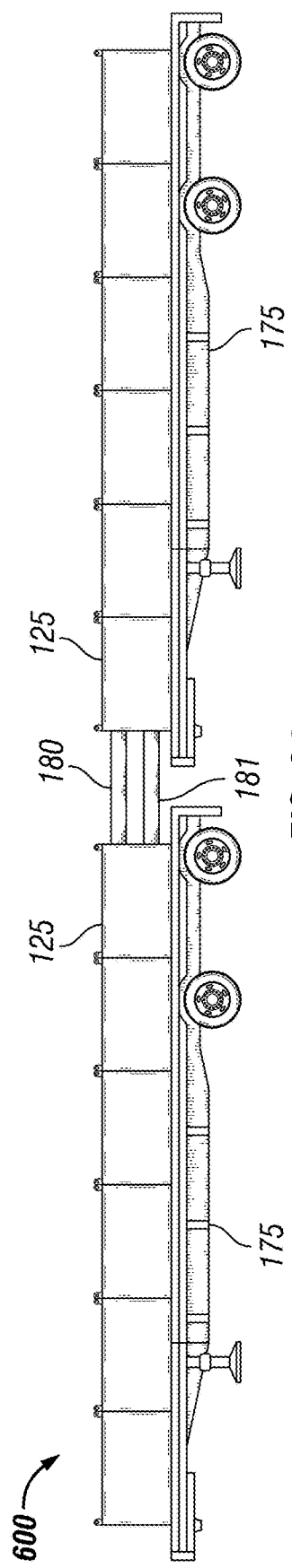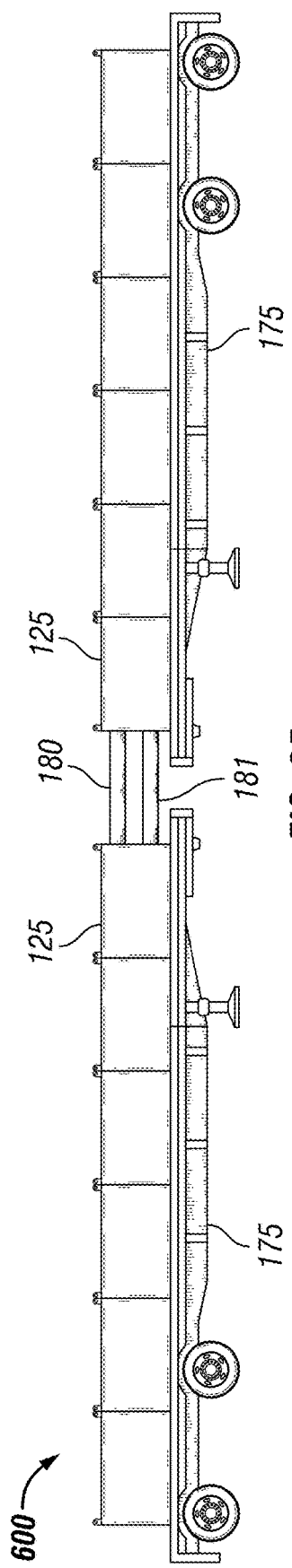

HIGH PRESSURE MANIFOLD, ASSEMBLY, SYSTEM AND METHOD

CROSS-REFERENCE TO RELATED APPLICATIONS

This application claims benefit of U.S. Provisional Patent Application Ser. No. 62/489,468, filed on Apr. 25, 2017, the content of which is hereby incorporated by reference in its entirety. This application also claims benefit of U.S. Provisional Patent Application Ser. No. 62/505,066, filed on May 11, 2017, the content of which is hereby incorporated by reference in its entirety. This application also claims benefit of U.S. Provisional Patent Application Ser. No. 62/617,164, filed on Jan. 12, 2018, the content of which is hereby incorporated by reference in its entirety.

STATEMENT REGARDING FEDERALLY SPONSORED RESEARCH OR DEVELOPMENT

Not applicable.

BACKGROUND OF THE APPLICATION

The application relates generally to a low fluid pressure and high fluid pressure manifold system operable in oil and gas production.

Hydraulic fracturing, sometimes called "fracing" or "fracking" is a process for increasing the flow of oil or gas from a well that typically involves pumping specific types of liquids into a well, under pressures that are high enough to fracture the rock forming interconnected fractures that serve as pore spaces for the movement of oil and natural gas to a wellbore. The hydraulic fracturing process typically involves providing one or more sources of fracturing fluid to be directed into a well, one or more fracturing pumps for producing high pressure fluid flow and the necessary conduit for conveying the fracturing fluid. Hydraulic fracturing operations typically include a piece of equipment called a manifold that receives and directs low pressure fluid to a bank of hydraulic fracturing pumps ("fracturing pumps" or "frac pumps") and receives high pressure fluid from the frac pumps via a frac pump output header or "missile" at pressures up to 103.4 MPa (15,000 psi) and conveys the high pressure fluid toward a tree and wellhead of a wellbore. To reduce the area or space used at a well site, one common arrangement of frac pumps involves using two opposing rows often referred to as a "right hand pump bank" and a "left hand pump bank" of frac pumps. Opposing rows of frac pumps are well-known by the skilled artisan and an example of two opposing rows of frac pumps may be seen in United States Patent Application Publication Number 20140277772, titled "Fracturing pump identification and communication" published on Sep. 18, 2014, which is herein incorporated by reference in its entirety.

As of the date of this application, one conventional manifold in common use is provided as either a manifold trailer or as a separate manifold that is trucked to a well site on a flatbed trailer and either operated on the flatbed or removed and placed on the ground for operation. Exemplary manifold trailers are commercially available from sources such as Forum Energy Technologies, Houston, Tex., U.S.A. and Industrial Diesel Manufacturing and Service, Ltd., Fort Worth, Texas, U.S.A. In addition to the manifold trailer described in Patent Application Publication Number 20140277772 referenced above, another exemplary manifold trailer is described in United States Patent Application Publication Number 20170122060, titled "Manifold trailer having a single high pressure output manifold" published on May 4, 2017, which is herein incorporated by reference in its entirety. As known in the art, these types of manifold trailers include an array of high pressure conduit, low pressure conduit and manual valves. Because these types of manifolds are designed for operation with ten or twelve stations, i.e., points of connection, for connecting to each of the frac pumps, they are typically quite heavy and large having lengths from about 15.0 meters to 18.0 meters (50.0 feet to 60.0 feet). Unfortunately, some hydraulic fracturing operations do not require the use of an entire manifold of ten to twelve stations. For example, some hydraulic fracturing operations require only six or fewer fracturing pumps. In such instances, only part of the manifold is actually in use meaning that there is a wasted expense associated with the cost of using a ten or twelve station manifold. Also, because of the complexity of construction of such manifolds, if a particular section of the manifold needs repair or inspection the entire manifold unit is typically removed and repaired off site requiring a different replacement manifold to be inserted into operation.

Another type of manifold currently in use includes a skid mounted manifold of what is referred to as a modular design allowing a manifold to be oriented in an array of configurations. This type of manifold provides an arrangement of fluid lines, fittings and valves ("frac iron") all downstream of the missile designed for receiving high pressure fluid from a single line and delivering the high pressure fluid to one or multiple wellheads of a well site. However, this type of manifold makes use of an outlay of frac pumps different than the two opposing rows of frac pumps described above and are not necessarily effective for reducing the congestion of equipment at a well site.

Overcoming the foregoing issues is desired.

SUMMARY OF THE APPLICATION

The present application is directed to a manifold system including at least a first manifold sub-assembly including a low pressure fluid conduit assembly for directing low pressure fluid to one or more target low pressure fluid destinations and a high pressure fluid conduit assembly for receiving high pressure fluid from one or more sources of high pressure fluid, wherein the low pressure fluid conduit assembly has two or more primary flow lines in controlled fluid communication and the high pressure fluid conduit assembly has two or more primary flow lines in controlled fluid communication, each primary flow line having an outlet for the high pressure fluid. The low pressure fluid conduit assembly may include one or more diverting and isolation valves operationally configured to control the flow of fluid between the primary flow lines of the low pressure fluid conduit assembly and the high pressure fluid conduit assembly may include one or more diverting and isolation valves operationally configured to control the flow of fluid between the primary flow lines of the high pressure fluid conduit assembly and a dedicated high pressure bypass line.

The present application is also directed to a manifold system for hydraulic fracturing operations at a well site including one or more manifold sub-assemblies, each manifold sub-assembly having a particular pump count, wherein one or more manifold sub-assemblies may be provided having a total pump count equal to a total number of hydraulic fracturing pumps at the well site. In an embodiment of the manifold system including at least two manifold sub-assemblies, the manifold sub-assemblies may be operably communicated together to provide a manifold system having a total pump count equal to the total number of hydraulic fracturing pumps.

The present application is also directed to a method of delivering high pressure fluid to a well in hydraulic fracturing operations at a well site including (1) providing one or more low pressure fluid sources, (2) providing a manifold system having one or more manifold sub-assemblies in operable communication, each manifold sub-assembly including (a) at least two primary low pressure fluid lines operationally configured to receive low pressure fluid into the manifold system and route low pressure fluid to one or more hydraulic fracturing pumps, the primary low pressure fluid lines including one or more diverting and isolation valves and one or more isolation valves that may be actuated remotely, (b) at least two primary high pressure fluid lines operationally configured to receive high pressure fluid from the one or more hydraulic fracturing pumps and route the high pressure fluid to a well via at least one primary high pressure fluid line, the primary high pressure fluid lines including one or more diverting and isolation valves and one or more isolation valves that may be actuated remotely, (2) setting one or more one or more diverting and isolation valves and one or more isolation valves to an open position for routing high pressure fluid to the well via one or more primary high pressure fluid lines.

BRIEF DESCRIPTION OF THE SEVERAL VIEWS OF THE DRAWING

FIG. 11 is a top view of a simplified embodiment of a manifold system comprised of six four pump count manifold sub-assemblies for use with up to twenty four fracturing pumps.

FIG. 12 is a top view of a simplified embodiment of a manifold system comprised of eight four pump count manifold sub-assemblies for use with up to thirty two fracturing pumps.

FIG. 33 is a side view of another embodiment of a manifold system including multiple manifold sub-assemblies fluidly connected in series.

FIG. 34 is a side view of another embodiment of a manifold system including multiple manifold sub-assemblies fluidly connected in series.

FIG. 35 is a side view of another embodiment of a manifold system including multiple manifold sub-assemblies fluidly connected in series.

DETAILED DESCRIPTION

Figure 1:
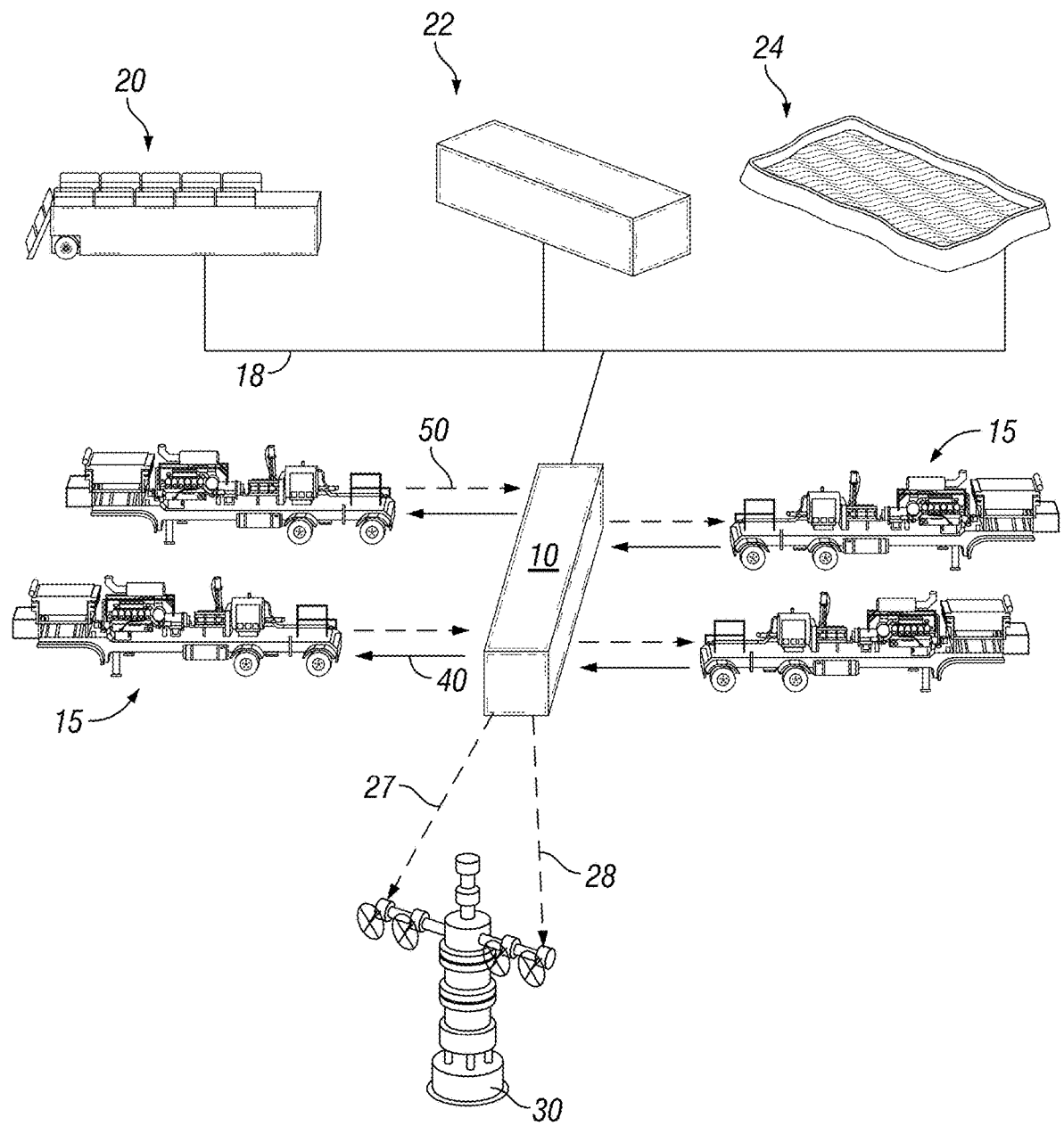
FIG. 1 is a simplified layout of a common frac spread.

The Figures described above and the written description of specific structures and functions below are not provided to limit the scope of the invention. Rather, the Figures and written description are provided to teach persons skilled in the art to make and use the invention for which patent protection is sought. The skilled artisan will appreciate that not necessarily every feature of a commercial embodiment of the invention is described or shown. Also, it is to be understood that the present invention is not limited to particular embodiments. It is also to be understood that the terminology used herein is for the purpose of describing particular embodiments only, and is not intended to be limiting.

Approximating language, as used herein may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value. The terms "first," "second," and the like, herein do not denote any order, quantity, or importance, but rather are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be", or "can" or "can be". Furthermore, the use of relational terms, such as, but not limited to, "top," "bottom," "left," "right," "upper," "lower," "down," "up," "side," and the like are used in the written description for clarity in specific reference to the Figures and are not intended to limit the scope of the invention. As used herein, any references to "one embodiment" or "an embodiment" or "another embodiment" means that a particular element, feature, structure, or characteristic described in connection with the embodiment is included in at least one embodiment. The appearances of the phrase "in one embodiment" in various places in the specification are not necessarily referring to the same embodiment.

As used in this specification the combination of various equipment used for hydraulic fracturing of a well is typically referred to in the industry as a "spread," "fracturing spread" or "frac spread" and such may be used herein interchangeably. General details regarding hydraulic fracturing and the equipment used can be found in a large number of references including, for example, U.S. Pat. No. 3,888,311, entitled "Hydraulic Fracturing Method," issued on Jun. 10, 1975, and United States Patent Application Publication Number 20120085541, entitled "Method and apparatus for hydraulically fracturing wells," published on Apr. 12, 2012, each of which is incorporated herein by reference in its entirety. Herein, the phrase "transportable pumping unit" may be used interchangeably with the phrases "fracturing pump" and "frac pump," which typically includes a trailer housing an engine, transmission, pump, e.g., a Triplex pump or Quintuplex pump, a hydraulic system, power end lubrication, packing lubrication and all necessary valves and controls for operation of the frac pump as understood by the skilled artisan. Herein, a plurality of frac pru in use at a well site may be referred to collectively as a "frac pump subsystem." Examples of commercially available frac pumps suitable for use as part of this application include, but are not necessarily limited to the FT-2251 Trailer Mounted Fracturing United available from Stewart & Stevenson, Houston, Tex., U.S.A.; Triplex and Quintuplex frac pumps available from Freemyer Industrial Pressure L.P., Fort Worth, Tex., U.S.A.; and the Q10 Pumping Unit available from Halliburton Energy Services, Inc., Houston, Tex., U.S.A. The terms "mobile," "portable" and "transportable" may both be used herein to describe an item, object, system or assembly described herein as being readily movable from one location to another. Herein, the term "megapascal" may be shortened to "MPa." Herein, the phrase "pounds per square inch" may be shortened to "psi." Herein, "ANSI" refers to standards from the American National Standards Institute. Herein, "ISO" refers to standards from the International Organization for Standardization.

As mentioned previously, transportable pumping units are often aligned in series in two opposing rows often referred to as a "right hand pump bank" and a "left hand pump bank." As understood by the skilled artisan, the right hand and left hand pump banks are aligned on opposing sides of a manifold disposed there between. The number of frac pumps in a pump bank may vary from one frac pump up to about twelve frac pumps for a single wellbore. As such, in one aspect the application provides hydraulic fracturing operators with the ability to adjust the size and capacity of a manifold by incorporating the present manifold system of any number of individual manifold sub-assemblies having pump counts of two or more as may be necessary to provide a suitable manifold system at a particular well site according to the number of frac pumps in operation or anticipated for operation at the well site. As such, the present manifold system is operationally configured to conform to the size of a corresponding hydraulic fracturing operation at any given point in time.

In another aspect, the application provides a method of constructing an operable manifold system using a combination of individual manifold sub-assemblies prior to a hydraulic fracturing operation and disassembling the manifold system following a hydraulic fracturing operation.

In another aspect, the application provides a novel manifold system comprising individual one or more manifold sub-assemblies including low pressure and high pressure fluid conduit lines including one or more valves operationally configured to connect to and control the flow of fluid to and from one or more fracturing pumps. For example, a manifold sub-assembly may be operationally configured to connect to four fracturing pumps—two connections on each side of the sub-assembly.

In another aspect, the application provides a novel manifold sub-assembly having low pressure and high pressure fluid conduit provided as frac pump stations and one or more valves, the frac pump stations being provided in two or more individual sub-assemblies, the frac pump stations being fluidly communicated to a left bank of fracturing pumps and a right bank of fracturing pumps.

In another aspect, the application provides a flatbed trailer adjustable in length to accommodate a plurality of manifold system lengths according to the number of individual manifold sub-assemblies used to form a particular manifold system.

In another aspect, the application provides a novel manifold system having low pressure and high pressure conduit assemblies with one or more valves that may be controlled remotely. Likewise, various operation parameters may be monitored and/or measured from a remote location, e.g., fluid pressure, fluid flow rates, fluid density, and any data collected may be communicated via a computer or other electronic device. For operation other than oil and gas hydraulic fracturing operations, the manifold system may receive and direct low pressure fluid to one or more target low pressure fluid destinations and receive high pressure fluid from one or more high pressure fluid sources and convey the high pressure fluid to one or more destinations out from the manifold system.

In another aspect, the application provides a simpler and more cost effective method of interchanging manifold sub-assemblies for inspection purposes or during failure of one more parts of a manifold system that may occur during hydraulic fracturing operations. Typically, fracturing operators are required to have additional manifold trailers at their disposal at a well site because the high pressure iron of known manifolds is typically removed from service for detailed maintenance and inspection every six to twelve months. The present invention provides a manifold system comprised of manifold sub-assemblies operationally configured in a manner so that operators may simply remove individual manifold sub-assemblies from service for disposal, maintenance and/or inspection purposes and replace such sub-assemblies with other individual manifold sub-assemblies. Accordingly, the present manifold system and method may significantly reduce operating costs typically spent to operate known manifolds at a well site.

In another aspect, the application provides an operable manifold system comprising a plurality of individual manifold sub-assemblies interconnected structurally, each individual manifold sub-assembly being in fluid communication with (1) the other manifold sub-assemblies and (2) at least two frac pumps. Suitably, any conduit such as hydraulic hose and jumper hose used for manifold system operation are the same or similar in length and diameter allowing any spare or stored conduit to replace other conduit of the manifold system described herein.

In another aspect, the application provides a manifold sub-assembly operationally configured to be joined with one or more additional manifold sub-assemblies to construct an operable manifold system. Any one manifold sub-assembly provided may also be used for non-manifold operations.

In another aspect, the application provides a plurality of manifold sub-assemblies operationally configured to form an operable manifold system. Where two or more independent operable manifold sub-assemblies are present, such manifold sub-assemblies may be combined together to form a larger manifold system for a hydraulic fracturing operation.

To better understand the novelty of the invention, reference is hereafter made to the accompanying drawings. With reference now to FIG. 1, a simplified layout of a common frac spread is provided illustrating the flow of low pressure fluid from one or more low pressure fluid sources 18 to a manifold 10 and frac pumps 15 that convert the low pressure fluid into high pressure fluid for delivery back to the manifold 10 for conveyance to the wellhead 30 via high pressure conduit 27, 28 such as pipe commonly referring to as "high pressure treating iron." Typical low pressure fluid sources 18 include, but are not necessarily limited to one or more fluid storage tanks (or "frac tank 20"), a fluid blending and transfer unit (or "blender 22") and a fluid storage reservoir 24 or other fluid storage container. As understood by persons of ordinary skill in the art of hydraulic fracturing operations, the number of frac pumps 15 employed may vary. Thus, it is desirable to provide a novel manifold system that best suits the particular hydraulic fracturing operation requirements for a particular operation without having to waste money associated with known manifolds that are often too large for certain hydraulic fracturing operations.

Figure 2:
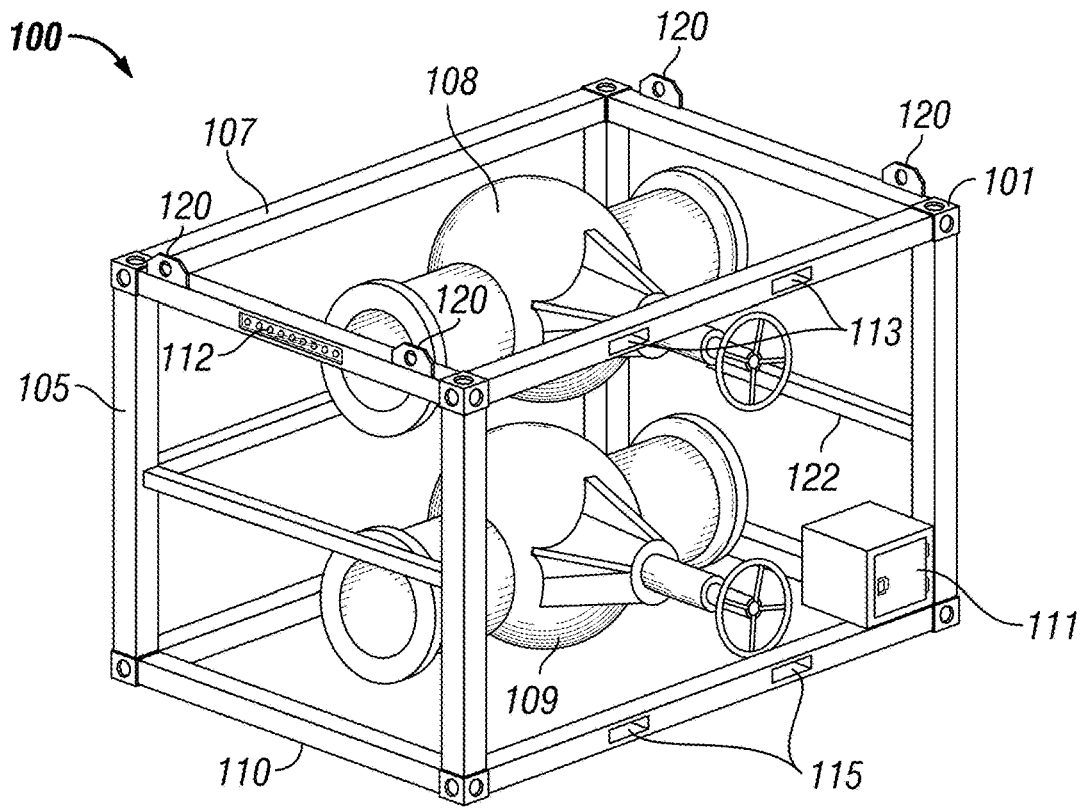
FIG. 2 is a perspective view of a simplified manifold sub-assembly of this application.

Turning to the simplified illustration of FIG. 2, an operable manifold of this application may be referred to as a "manifold system 500" comprising one or more manifold sub-assemblies 100. In other words, a single manifold sub-assembly 100 may be employed as the manifold system 500 or two or more manifold sub-assemblies 100 may be operably communicated or otherwise assembled together according to the demands or size of a particular hydraulic fracturing operation, each manifold sub-assembly 100 having a low pressure side and a high pressure side. In addition, the manifold system 500 and/or individual sub-assemblies 100 may be built to scale according to anticipated operational demands.

One suitable manifold sub-assembly 100 is provided with a main support framework 105 operationally configured to house and support the remaining component parts of the manifold sub-assembly 100, namely, the low pressure fluid conduit assembly 108 and the high pressure fluid conduit assembly 109 (often referred to in the art as "high pressure treating iron"). To this end, one framework 105 may include a box type framework defined by a planar bottom side 110 providing for a level orientation atop of one or more support surfaces such as the bare ground, a floor, a roof of a structure, a trailer flatbed or other platform such as a concrete platform or wooden platform or pallet. Although a manifold sub-assembly 100 secured within a framework 105 may be beneficial for transport purposes, on-site installation, removal, and maintenance, in another embodiment, a manifold sub-assembly 100 may be mounted to a chassis such as a transportable chassis or a trailer type device rather than be secured to a framework 105.

Additional framework 105 features contemplated herein include, but are not necessarily limited to one or more storage boxes 111 for tools and other items mounted on the outside of the framework 105. One or more light sources 112 may also be disposed along the framework 105 as desired, e.g., light emitting diodes ("LEDs"), LED strips, to provide lighting as desired. A framework 105 may also include a fixed ladder.

As shown in FIG. 2, the low pressure fluid conduit assembly 108 is located above the high pressure treating iron 109. In another embodiment, the low pressure fluid conduit assembly 108 may be located below the high pressure treating iron 109. Because the high pressure treating iron 109 is often constructed from larger and heavier materials, it may be desirable to locate the high pressure treating iron 109 below the low pressure fluid conduit assembly 108.

For hydraulic fracturing operations, a suitable framework 105 may be constructed from one or more metals strong enough to form a crash type frame during use and/or transport. Suitable metals include, but are not necessarily limited to aluminum, steel, titanium, and combinations thereof. In one particular embodiment, the framework 105 may be constructed from stainless steel. In another particular embodiment, the framework 105 may be constructed from mild steel. In another particular embodiment, the framework 105 may be constructed from aluminum. A metal framework 105 may be fabricated from framework sections or plank type members similar as other metal building materials and be assembled via fasteners, welds, and combinations thereof as understood by the skilled artisan. Suitable fasteners include, but are not necessarily limited to nut/bolt type fasteners constructed from stainless steel, mild steel, and combinations thereof. Fasteners may also be zinc-plated. In operations other than hydraulic fracturing, the framework 105 may be constructed from one or more non-metal materials or combined with one or more metals as desired. Suitable non-metal materials include, but are not necessarily limited to plastics, woods, composite materials, rubbers, and combinations thereof. One particular framework 105 may include a metal skeleton and an outer plastic covering.

In addition, the materials making up the framework 105 may be manufactured in accordance with DNV 2.71 or equivalent, for use in offshore applications. The framework 105 may also be provided with ISO container fittings and twist locks 101 in each corner of the framework 105, allowing a plurality of framework 105 to be operably communicated, i.e., secured together, in series or parallel as well as be stacked on top of one other for storage and/or transport in a secure manner.

Still referring to FIG. 2, the framework 105 may be operationally configured to be lifted for transport via lifting equipment including, but not necessarily limited to mechanical lifts such as various types of forklifts, overhead cranes and hoists. For example, the framework 105 may include (1) upper openings or pockets 113, 113 and (2) lower openings or pockets 115, 115 on one or multiple sides of the framework 105 for receiving individual forks of a forklift, or other type of lift, in a manner effective to transport individual manifold sub-assemblies 100. As further shown in FIG. 2, the upper part 107 of the framework 105 may also include one or more lift eyes 120, handles, hook members, or the like for lifting and transporting the individual manifold sub-assemblies 100. As seen in FIG. 2, the upper part 107 may include a total of four lift eyes 120 near the corners of the framework 105. The framework 105 may also include lift eyes 120 on each side of the upper part 107 of the framework 105. The framework 105 itself may also be used for lifting purposes.

Still referring to FIG. 2, the framework 105 may include one or more support members 122 such as crossbars or the like for providing structural support to a framework 105 and/or connection points for the low pressure fluid conduit assembly 108 and/or the high pressure treating iron 109 to the framework 105. In one suitable embodiment, the low pressure fluid conduit assembly 108 and/or the high pressure treating iron 109 may be secured to the framework 105 and/or support members 122 using anti-vibration mounts as known by the skilled artisan in the petroleum industry. One exemplary type of anti-vibration mount includes a wire rope isolator and cable mount commercially available from Vibro/Dynamics L.L.C., Broadview, Ill., U.S.A.

The basic layout of the low pressure fluid conduit assembly 108 and a high pressure treating iron 109 for various size manifold sub-assemblies 100 are provided in the simplified embodiments of FIGS. 3-6. Although the basic layout or design of the low pressure fluid conduit assembly 108 and the high pressure treating iron 109 described herein are substantially similar, it is contemplated that in another embodiment the low pressure fluid conduit assembly 108 and the high pressure treating iron 109 may include different layouts, designs or configurations.

Figure 3:
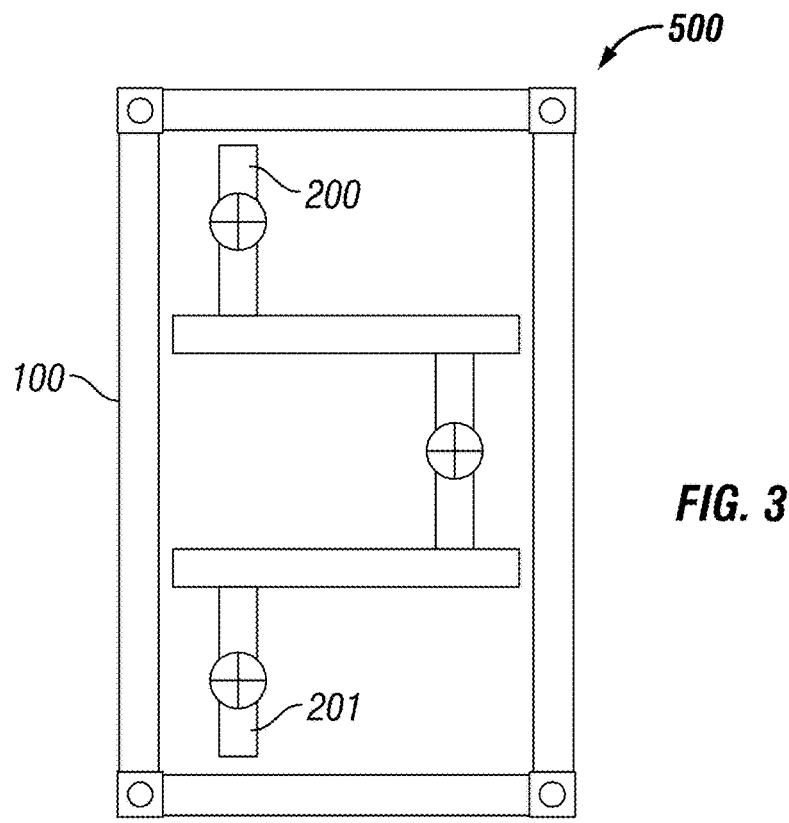
FIG. 3 is a top view of a simplified layout of the low pressure fluid conduit assembly and high pressure treating iron for a two fracturing pump manifold sub-assembly.
Figure 4:
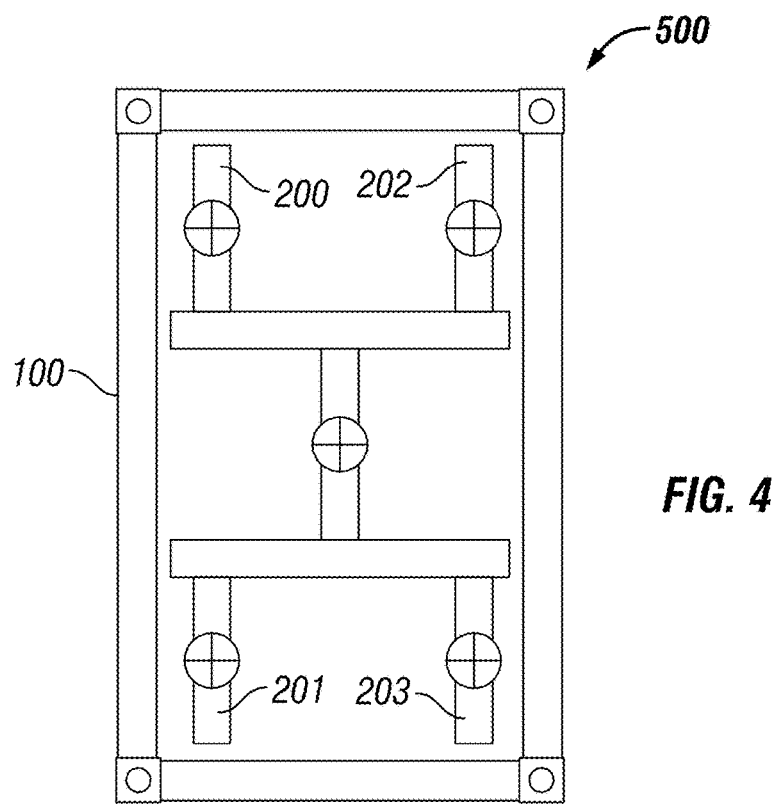
FIG. 4 is a top view of a simplified layout of the low pressure fluid conduit assembly and high pressure treating iron for a four fracturing pump manifold sub-assembly.
Figure 5:
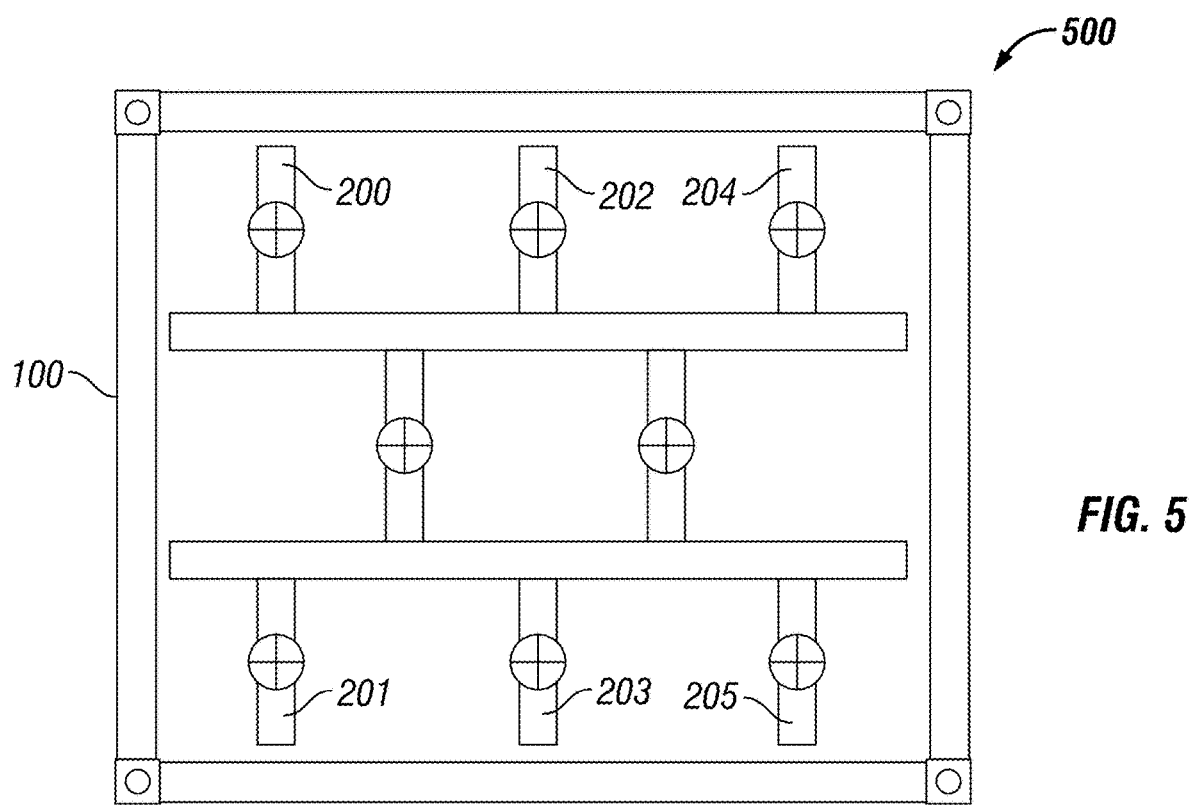
FIG. 5 is a top view of a simplified layout of the low pressure fluid conduit assembly and high pressure treating iron for a six fracturing pump manifold sub-assembly.
Figure 6:
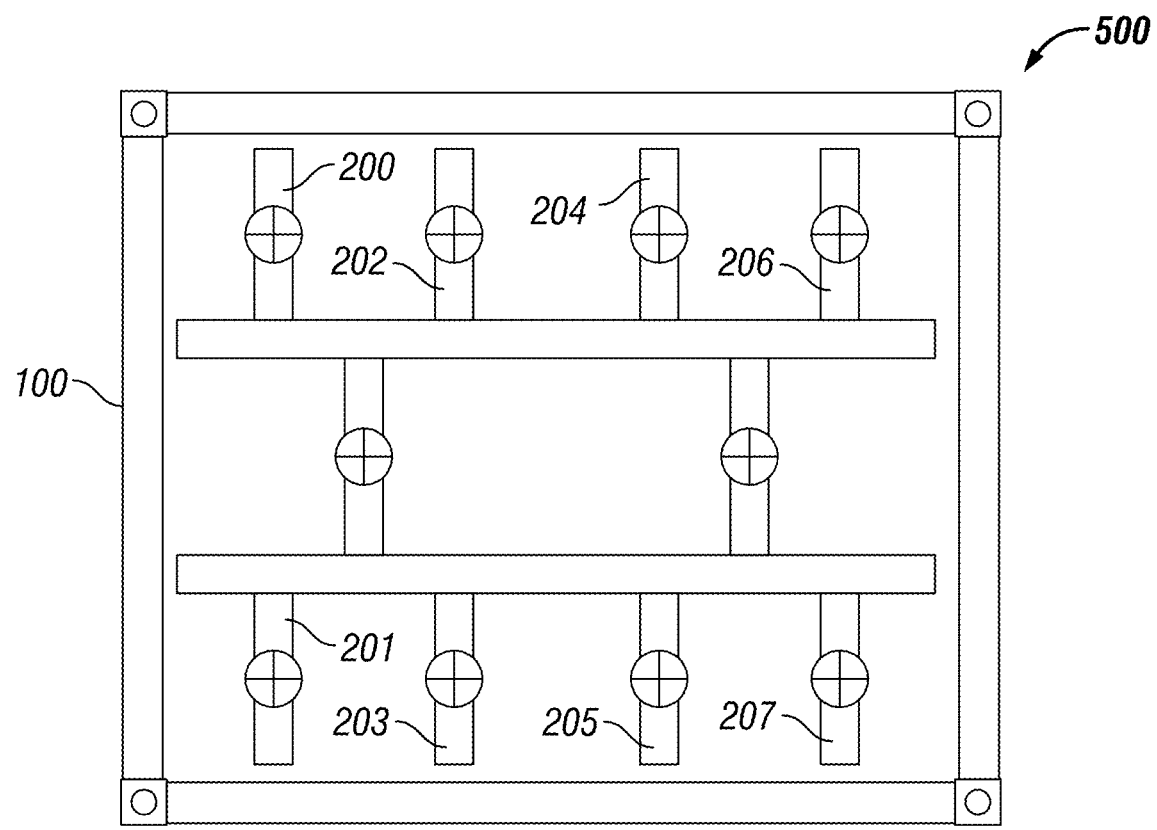
FIG. 6 is a top view of a simplified layout of the low pressure fluid conduit assembly and high pressure treating iron for an eight fracturing pump manifold sub-assembly.

Turning to FIG. 3, one exemplary manifold sub-assembly 100 of this application is operationally configured to operate with up to two individual frac pumps 15. The simplified manifold sub-assembly 100 depicted in FIG. 3 is a two pump count model, in other words the sub-assembly 100 has two distinct frac pump stations, first and second stations 200, 201, each station being designated for fluid communication with a distinct frac pump 15. A suitable manifold sub-assembly 100 as depicted in FIG. 3 includes two main or primary low pressure fluid lines and two main or primary high pressure fluid lines, one primary line of each corresponding to a left hand pump bank and the other primary line of each corresponding to a right hand pump bank. In another embodiment, manifold sub-assemblies 100 may include more than two primary lines as desire or as otherwise required for operation, e.g., for operation with three or more pump banks. FIG. 4 illustrates a simplified four pump count manifold sub-assembly 100 including additional third and fourth frac pump stations 202-203. FIG. 5 depicts a simplified six pump count manifold sub-assembly 100 including additional fifth and sixth frac pump stations 204-205. FIG. 6 depicts a simplified eight pump count manifold sub-assembly 100 including additional seventh and eighth frac pump stations 206-207.

One novel feature of the present invention includes that any one individual manifold sub-assembly 100, for example, the individual manifold sub-assemblies 100 described in FIGS. 3-6, may each be used exclusively as a standalone operable manifold for a particular hydraulic fracturing operation. In addition, any combination of any pump count manifold sub-assemblies 100 may be combined in operable communication to provide an operable manifold system 500 for a particular hydraulic fracturing operation having a particular number of frac pumps 15. For example, in a hydraulic fracturing operation utilizing six frac pumps an operator may employ a single six pump count manifold sub-assembly 100 as shown in FIG. 5 as the operable manifold system 500 for hydraulic fracturing operations. In another embodiment, an operator may combine a two pump count manifold sub-assembly 100 as shown in FIG. 3 and a four pump count manifold sub-assembly 100 as shown in FIG. 4 for use with a six frac pump 15 hydraulic fracturing operation. In one embodiment of a manifold system 500 employing multiple manifold sub-assemblies 100, the manifold sub-assemblies 100 may be aligned independent of the other manifold sub-assemblies 100 in an unattached orientation. In another embodiment, the framework 105 of each manifold sub-assembly 100 may be releasably secured to the framework 105 of the adjacent manifold sub-assembly 100. Without limiting the mode of framework 105 attachment, suitable attachment may be accomplished using one or more fasteners such as nuts/bolts, securing pins, ISO corner fittings and twist locks 101 (see FIG. 2), and combinations thereof.

Any combination of two or more manifold sub-assemblies 100 is herein contemplated according to the demands of a particular hydraulic fracturing operation and the manifold sub-assemblies 100 available to any particular user(s). It should also be noted that the manifold sub-assembly 100 of this application is not necessarily limited to a particular number of frac pump stations and therefore, in another embodiment a manifold sub-assembly 100 may be provided as a ten pump count manifold sub-assembly 100 or greater. For simplicity, the invention will be discussed in terms of a two pump count manifold sub-assembly 100 up to an eight pump count manifold sub-assembly 100.

Figure 7:
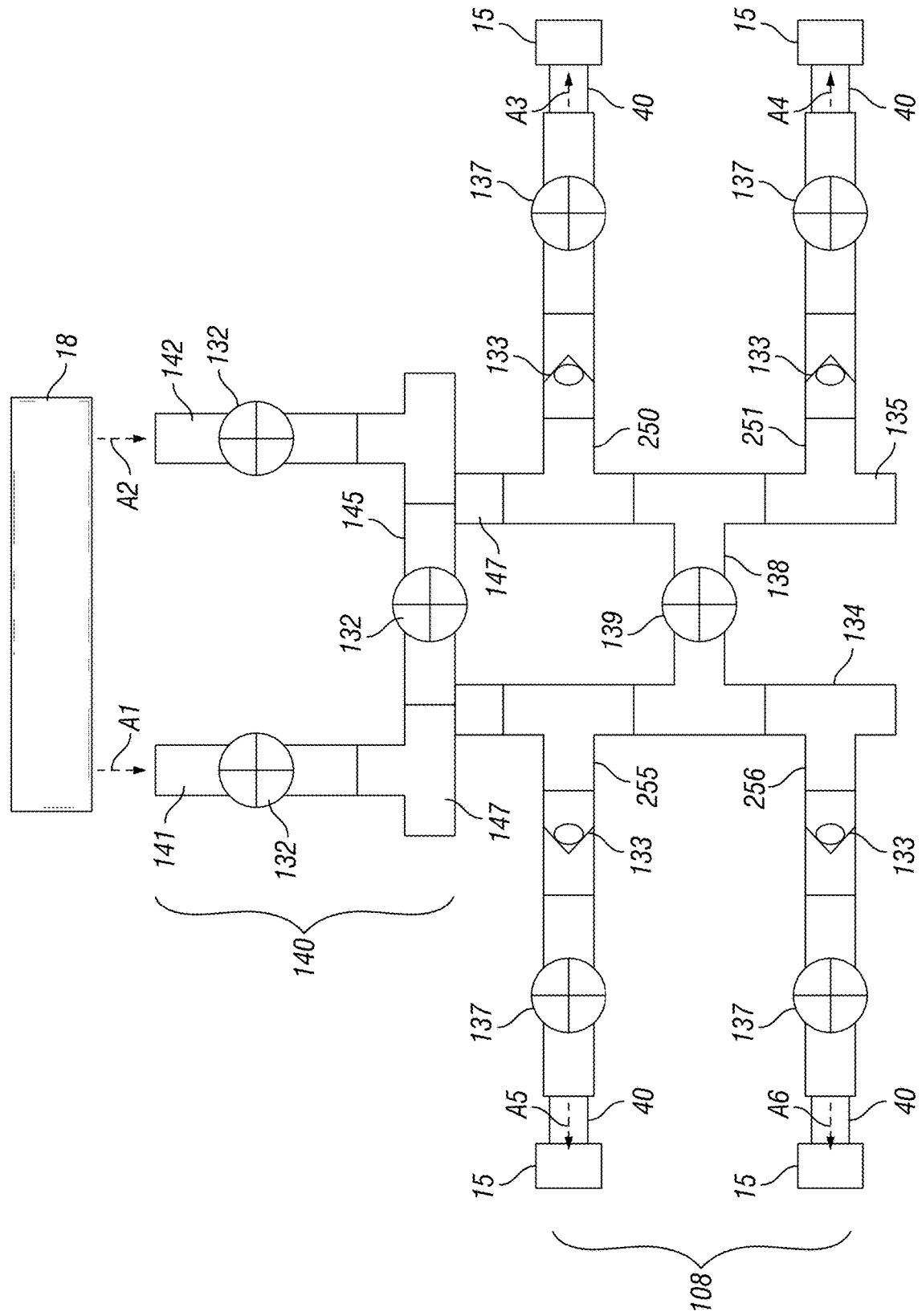
FIG. 7 is a top view of a simplified layout of a low pressure fluid conduit assembly of a four frac pump manifold sub-assembly including a fluid intake assembly in fluid communication with the low pressure fluid conduit assembly.

Referring to FIG. 7, an exemplary low pressure fluid conduit assembly 108 of a four pump count manifold sub-assembly 100 may include a left side main line or primary line 134 corresponding to a left hand pump bank and a right side main line or primary line 135 corresponding to right hand pump bank, the low pressure fluid conduit assembly 108 being fluidly communicated with a fluid intake assembly 140 (or "suction header 140") operationally configured for fluid communication with one or more low pressure fluid sources 18 (see Arrows A1 and A2). Although other configurations are herein contemplated, in this embodiment, the primary lines 134, 135 are depicted in parallel alignment and are in fluid communication via at least a first diverter conduit or cross conduit 138. As depicted in FIG. 4, a four pump count manifold sub-assembly 100 has two frac pump stations 200, 202 in fluid communication with the right side primary line 135 and two frac pump stations 201, 203 in fluid communication with the left side primary line 134—each frac pump station corresponding to a different frac pump 15 for routing fluid thereto (see Arrows A3-A6). In the illustration of FIG. 7, the low pressure fluid lines of the frac pump stations 200 and 202 are indicated by reference numbers 250 and 251 and the low pressure fluid lines of the frac pump stations 201 and 203 are indicated by reference numbers 255 and 256. Each of the low pressure fluid lines is fluidly communicated with a corresponding frac pump 15 via low pressure conduit 40. Although size and type of low pressure conduit may vary depending on the particular operation at hand and the scale of such operation, for hydraulic fracturing operations suitable low pressure conduit 40 includes, but is not necessarily limited to schedule 40 steel pipe.

Still referring to FIG. 7, the fluid intake assembly 140 may include one or more fluid flow lines such as a left side inlet 141 and a right side inlet 142 as shown, the left side inlet 141 being fluidly communicated with the left side primary line 134 and the right side inlet 142 being fluidly communicated with the right side primary line 135. In this embodiment, the inlets 141, 142 lie in fluid communication via a cross conduit 145 whereby each of the inlets 141, 142 and the cross conduit 145 include isolation valves 132 for controlling the flow of low pressure fluid through the fluid intake assembly 140. The low pressure fluid conduit assembly 108 may also include one or more isolation valves 137 for controlling the flow of fluid through each of the frac pump stations 200-203 of the low pressure fluid conduit assembly 108 and one or more diverting and isolation valves 139 disposed along the cross conduit 138 operationally configured to control the flow of low pressure fluid between the primary lines 134 and 135. In addition, each of the low pressure fluid lines 250, 251, 255 and 256 may also include at least one high pressure check valve 133, i.e., a non-return valve, operationally configured to prevent the flow of high pressure fluid into the primary lines 134 and 135 of the loFw pressure fluid conduit assembly 108. A suitable high pressure check valve 133 includes, but is not necessarily limited to a high pressure check valve commercially available and used by persons of ordinary skill in the art of piping. Examples of suitable high pressure check valves 133 include flapper or clapper style check valves and spring loaded check valves, i.e., a dart valve. Clapper style check valves, unlike dart style valves, are operationally configured for use with fluids heavily laden with proppants, ball sealers and other solids. Clapper style check valves include threaded seat features with a self-locking design to prevent the valve from coming loose during operation. A suitable clapper style check valve may be coated in urethane or the like to reduce delamination while offering consistent sealing.

Still referring to FIG. 7, a fluid intake assembly 140 is suitably constructed from low pressure piping rated to 1.72 MPa (250.0 psi) maximum pressure. Suitable low pressure piping may be constructed from mild steel, stainless steel, aluminum, and combinations thereof. Suitable low pressure isolation valves 132, 137, 139 employed by the fluid intake assembly 140 and low pressure fluid conduit assembly 108 may include, but are not necessarily limited to butterfly valves. In one embodiment, the low pressure isolation valves 132, 137, 139 may be manually operated. In another embodiment, one or more of the low pressure isolation valves 132, 137, 139 may be remotely operated via an actuator in communication with a particular valve, e.g., an electric actuator, a pneumatic actuator, or a hydraulic actuator. In one embodiment, pneumatic actuation, electrical actuation and hydraulic actuation may be performed remotely via one or more controls. As such, the manifold system 500 suitably includes a control system including control circuitry in electrical communication and/or wireless communication with various component parts of the manifold system 500 including, but not necessarily limited to the various valves discussed herein. In one embodiment, the manifold system 500 may include one or more control panels or consoles located on the manifold system 500 and/or one or more control panels located remotely from a control station or the like that are operationally configured to (1) monitor operation parameters of the manifold system 500 such as fluid pressure and/or fluid rate and (2) open/close the various valves of the manifold system 500 via remote actuation. Remote operation of the isolation valves 132, 137, 139 may also be performed using a touch screen type control panel tethered to the manifold system 500 via cable including, but not necessarily limited to electric cable and fiber optic cable. A suitable remote touch screen type control panel may also be communicated with the control system via a wireless connection. In hydraulic fracturing operations, cable may include a length from the manifold system 500 as desired, e.g., a length up to about 91.4 meters (about 300.0 feet). Likewise, wireless communication of the remote touch screen control panel may extend a distance up to about 3.22 km (about 2.0 miles). Remote operation of isolation valves 132, 137, 139 may also be performed via internet based applications. In still another embodiment, pneumatic actuation may be performed mechanically via a pneumatic valve toggle switch as known to the skilled artisan. The control system of the manifold system 500 may also be electronically communicated with control systems of one or more other pieces of equipment at a well site for hydraulic fracturing operations.

As appreciated by those skilled in the art, low pressure isolation valves 132, 137, 139 such as butterfly valves typically operate through 90.0 degrees from a completely open position to a completely closed position. Any position between fully open and fully closed may affect the flow of fluid there through. As stated, the isolation valves 132, 137, 139 may be actuated remotely thereby eliminating personnel from having to manually operate valves near high pressure treating iron 109. A suitable actuator for use herein may be mounted atop of an isolation valve 132, 137, 139 in such a manner that its operating mechanism is in direct contact with the valve. As a particular actuator opens or closes, the internal mechanisms of the isolation valve 132, 137, 139 operate in unison with the actuator. In another embodiment, a number representing an isolation valve and the location of the isolation valve along the manifold system 500 may be added or assigned to each actuator and programmed into the control system of the manifold system 500 for valve identification purposes.

In one particular mode of operation, low pressure actuators and high pressure actuators may be controlled by four-way air valves located on the manifold system 500. In one embodiment, the air supply may be fluidly connected to auxiliary equipment effective to provide constant air supply. Pneumatic valves may be controlled via two to twenty conductor cables connected to a control console or the like of the control system. A suitable control panel or console may be portable for placement as desired. In addition, a power connection is suitably installed to provide 24 Volt power. Control switches used may include a locking lever to eliminate any accidental engagement due to accidental contact. In addition, one or more lights such as red LEDs may be employed to indicate when each valve is closed.

Figure 8:
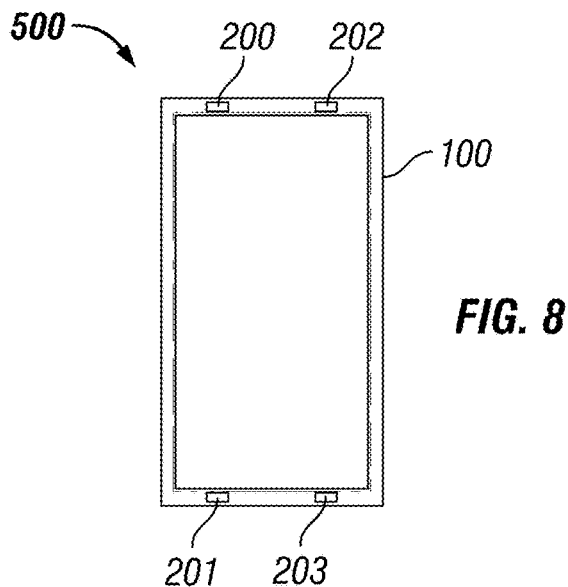
FIG. 8 is a top view of a simplified embodiment of a manifold system including a four pump count manifold sub-assembly.
Figure 9:
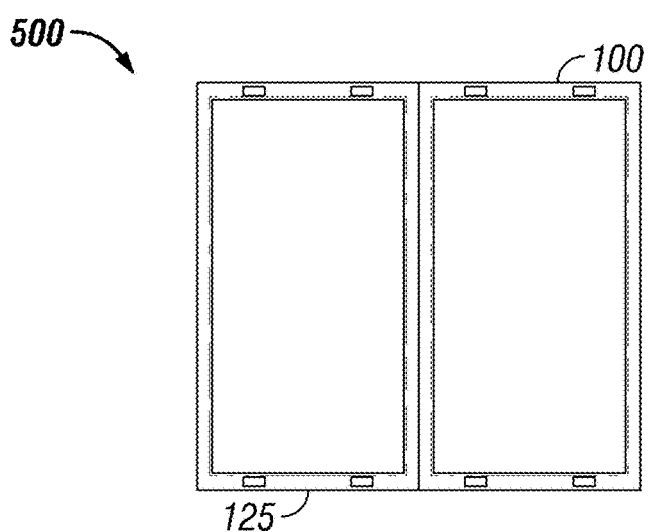
FIG. 9 is a top view of a simplified embodiment of a manifold system comprised of two four pump count manifold sub-assemblies for use with up to eight fracturing pumps.
Figure 10:
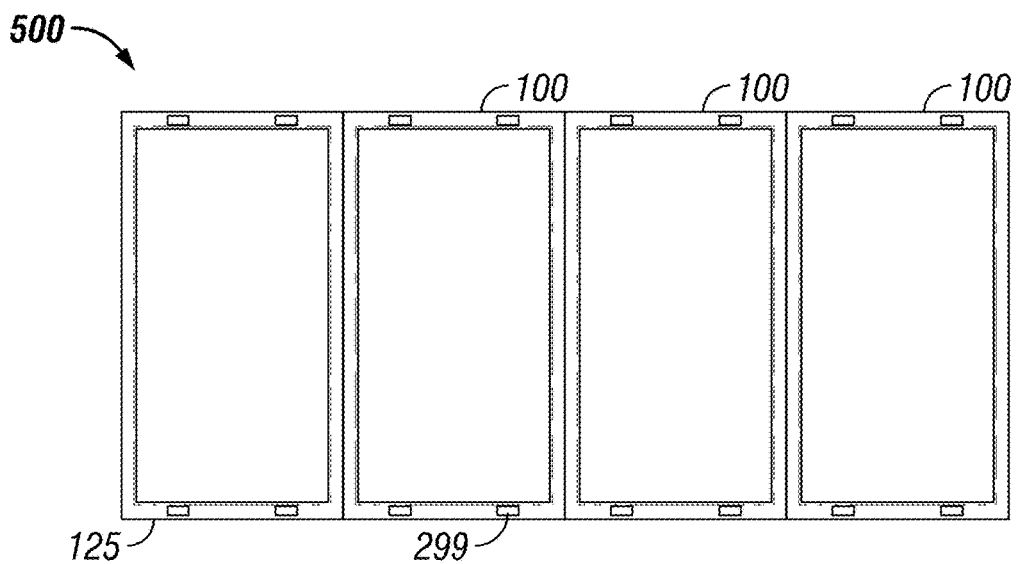
FIG. 10 is a top view of a simplified embodiment of a manifold system comprised of four four pump count manifold sub-assemblies for use with up to sixteen fracturing pumps.

As shown in FIG. 8, a manifold system 500 of this application may be comprised of a single manifold sub-assembly 100. As shown in FIGS. 9-12, individual manifold sub-assemblies 100 may be assembled or otherwise combined in operable communication to provide a larger manifold system 500 operationally configured to provide a desired number of frac pump stations 299. Suitably, a terminal manifold sub-assembly 125 located at an end of the manifold system 500 is used as the low pressure fluid inlet for receiving low pressure fluid from one or more low pressure fluid sources 18 as described above. In one embodiment, the low pressure conduits and/or piping of the low pressure fluid conduit assembly 108 may be connected in a manner effective to prevent fluid leaks via machined connectors or other tight tolerance fittings using clamps or the like to hold the piping together. In one embodiment, low pressure piping of adjacent manifold sub-assemblies 100 may be operably communicated, i.e., fluidly connected via Victaulic® type couplings or similar that are operationally configured to join pipe such as carbon steel and stainless steel pipe. In another embodiment, low pressure piping of adjacent manifold sub-assemblies 100 may be fluidly connected via flanged and bolt connections and Hammer Unions, including, but not necessarily limited to FIG. 206 Hammer Unions. Any combinations of all three types of connections may also be employed as desired.

In one embodiment, a fluid intake assembly 140 in fluid communication with one or more low pressure fluid sources 18 is releaseably attached to a terminal manifold sub-assembly 125 for delivering low pressure fluid to each of the primary lines 134, 135. One suitable fluid intake assembly 140 may be provided as a suction header operationally configured as a fluid connection for upstream low pressure fluid. As understood by the skilled artisan, a suction header 140 suitably attaches to upstream hoses or piping via connectors known in the art (not shown). Suitable connectors include, but are not necessarily limited to suction connectors, Hammer Unions such as Weco® FIG. 206 Hammer Unions or the like, flanged connections, safety iron consisting of a clamp and seal mechanism for affixing and sealing two individual pieces of piping together, and combinations thereof.

Figure 13:
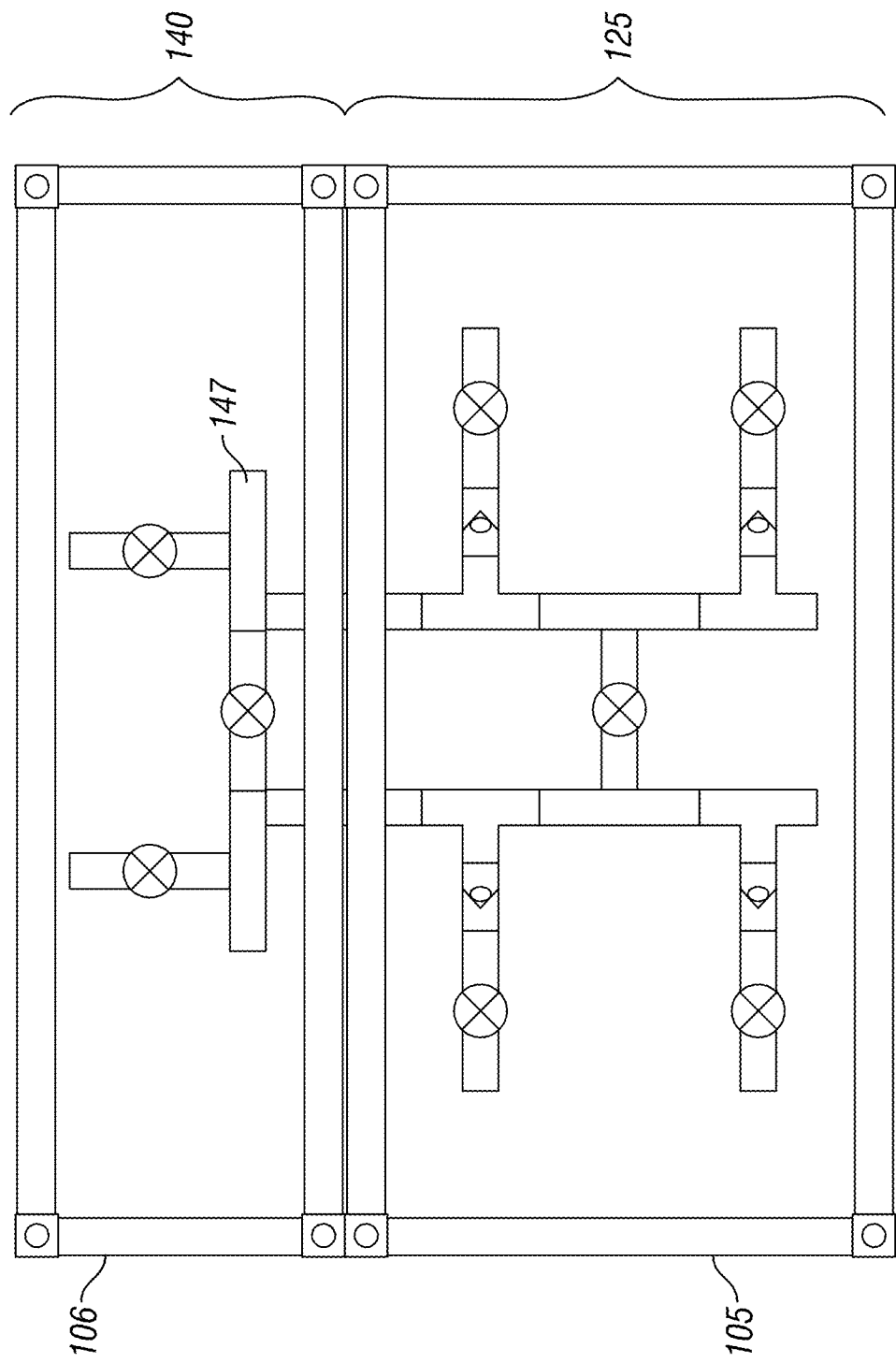
FIG. 13 is a top view of a simplified layout of a fluid intake assembly secured to the primary lines of a low pressure fluid conduit assembly of a manifold sub-assembly.

Turning to FIG. 13, a fluid intake assembly 140 may include a main support framework or chassis 106 operationally configured to house and support the outlet piping 147 of the fluid intake assembly 140 and releasably secure to the framework 105 of the manifold sub-assembly 100. For hydraulic fracturing operations, the outlet piping 147 of the fluid intake assembly 140 may be secured to the primary lines 134, 135 via clamps, Hammer Unions such as Weco® FIG. 206 Hammer Unions, flanged connections, safety iron consisting of a clamp and seal mechanism for affixing and sealing two individual pieces of piping together, and combinations thereof.

Figure 14:
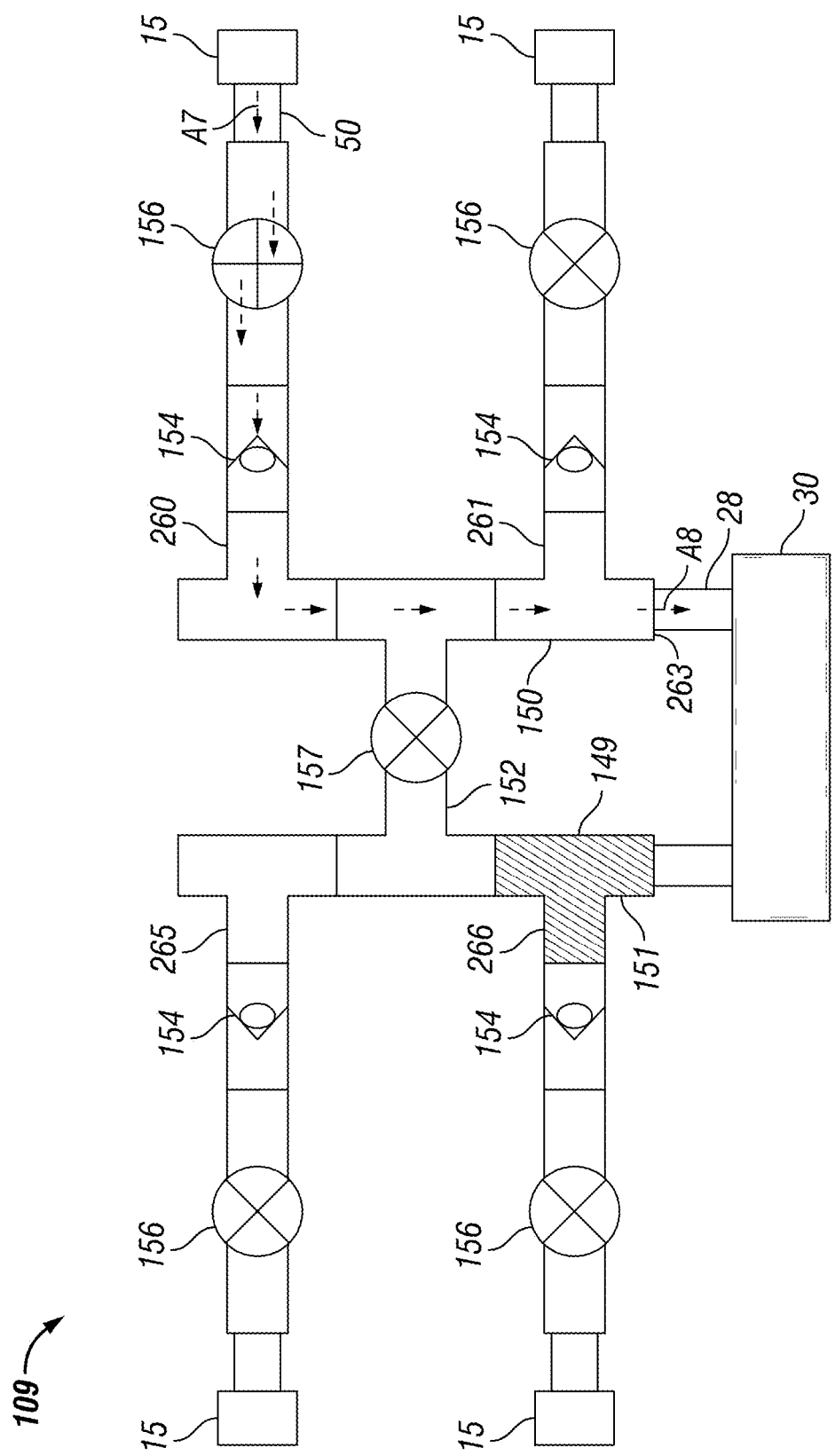
FIG. 14 is a simplified layout of high pressure treating iron of a manifold sub-assembly.

With attention to FIGS. 14-21, the discussion is now directed to the flow of high pressure fluid via the high pressure treating iron 109 of one or more manifold sub-assemblies 100 comprising the manifold system 500. As shown in FIG. 14, suitable high pressure treating iron 109 includes primary lines 149, 150 in fluid communication via at least a first diverter conduit or cross conduit 152. Similar as the low pressure side, the left side main line or primary line 149 corresponds to a left hand pump bank and the right side main line or primary line 150 corresponds to a right hand pump bank. Primary lines 149, 150 are also depicted in parallel alignment although other configurations are herein contemplated. In this embodiment, each of the frac pump stations includes high pressure fluid lines 260, 261 and 265, 266 operationally configured to receive high pressure fluid from corresponding frac pumps 15 (see, for example, Arrow 47). As shown, each high pressure fluid line 260, 261 and 265, 266 may include at least one high pressure check valve 154, i.e., a non-return valve, operationally configured to prevent the flow of high pressure fluid from the primary lines 149, 150 to the frac pumps 15. High pressure check valves 154 are well known in the art and are commercially available from various commercial sources such as FMC Technologies, Inc., Houston, Tex., U.S.A.

Each high pressure fluid line 260, 261 and 265, 266 may also include a high pressure isolation valve 156 operationally configured to control the flow of high pressure fluid from the frac pumps 15 to the primary lines 149, 150. High pressure isolation valves 156 are well known in the art and are commercially available from various commercial sources such as FMC Technologies, Inc., Houston, Tex., U.S.A. As shown, the cross conduit 152 may also include a similar high pressure isolation valve 157 that is operationally configured to control the directional flow of high pressure fluid between the primary lines 149, 150.

In addition, each of the low pressure fluid lines 250, 251, 255, 256 and the high pressure fluid lines 260, 261, 265, 266 may include piping that interconnects with their corresponding primary lines 134, 135, 149, 150 via straight Tee-members or the like as known in the art. For example, the high pressure fluid lines may employ one or more high pressure Tee-members 151 as shown in FIG. 14. In addition, the high pressure treating iron 109 may include one or more pressure valves as desired at or near an end of a manifold system 500.

With further reference to FIG. 14, one simplified example of valve operation and fluid flow through the high pressure treating iron 109 is presented. As shown, the isolation valve 156 corresponding to high pressure fluid line 260 is set to an open position allowing high pressure fluid to flow (see Arrow A7) from a corresponding frac pump 15 to the right side primary line 150 whereby the remaining three isolation valves 156 and the high pressure isolation valve 157 of the cross conduit 152 are set to a closed position maintaining fluid flow as depicted. In other words, high pressure fluid flows (see Arrow A7) from the frac pump 15 through the high pressure conduit 50 ("high pressure treating iron 50") and through the high pressure fluid line 260 into the primary line 150 and out from the manifold system 500 (see Arrow A8) via an outlet 263 of the primary line 150 downstream toward a wellhead 30 via high pressure treating iron 28 for hydraulic fracturing operations downhole. As shown in this illustration, when the high pressure isolation valve 157 is set at a closed position, high pressure fluid is prevented from flowing from the right side primary line 150 to the left side primary line 149.

Figure 15:
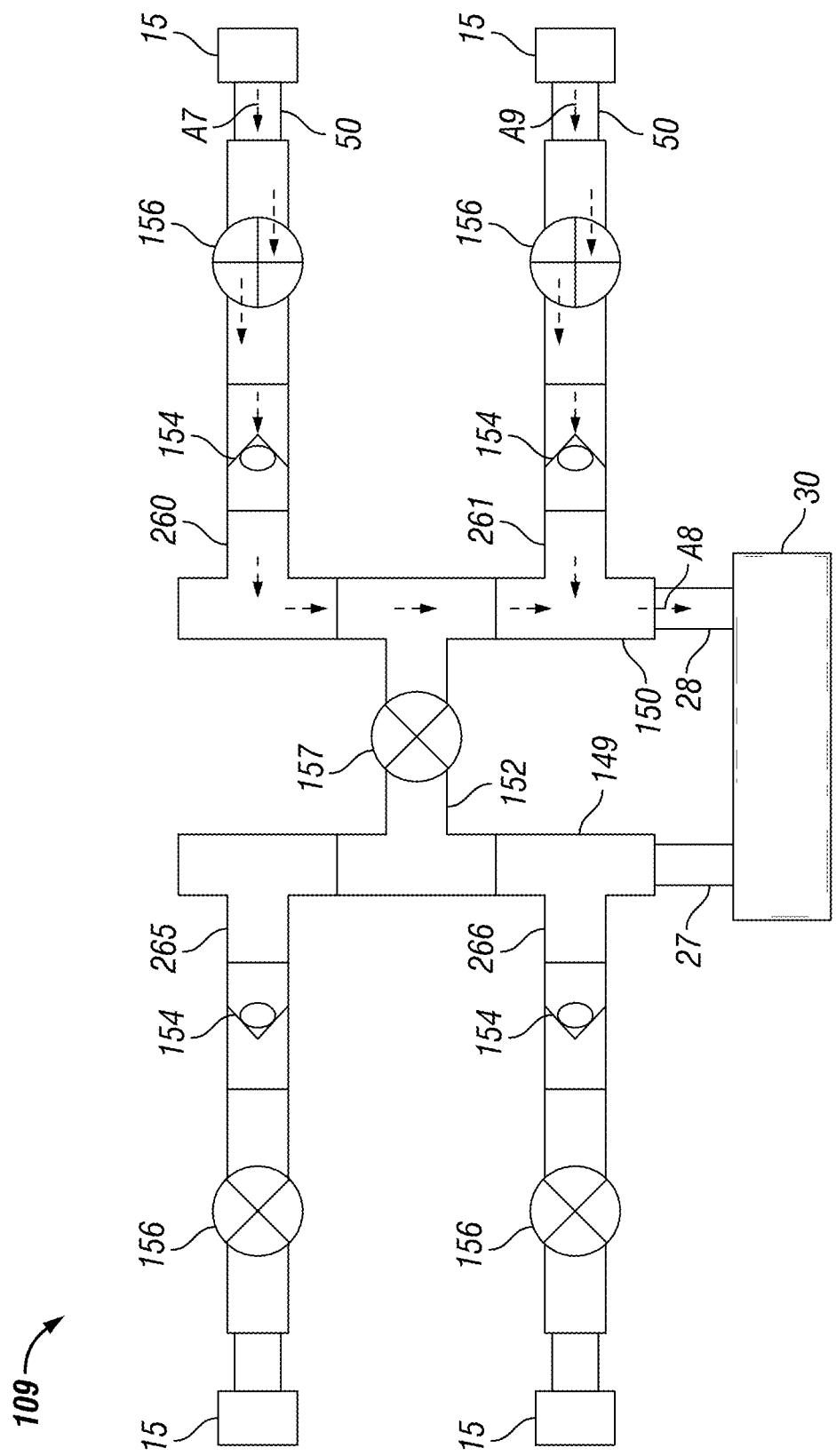
FIG. 15 is another simplified layout of high pressure treating iron of a manifold sub-assembly.

FIG. 15 illustrates exemplary fluid flow through the high pressure treating iron 109 with two of the four frac pump stations 260, 261 set to an open position allowing high pressure fluid to flow from the corresponding frac pumps 15 to the right side primary line 150 (see Arrows A7 and A9) with the remaining left side isolation valves 156 and the high pressure isolation valve 157 of the cross conduit 152 set to a closed position. In this illustration, high pressure fluid flowing from the corresponding frac pumps 15 combines in the primary line 150 whereby the combined high pressure fluid may be directed out from the manifold system 500 (see Arrow A8) downstream toward a wellhead 30 for downhole fracturing of a well. As stated above, when the high pressure isolation valve 157 is set at a closed position, high pressure fluid is prevented from flowing from the right side primary line 150 to the left side primary line 149.

Figure 16:
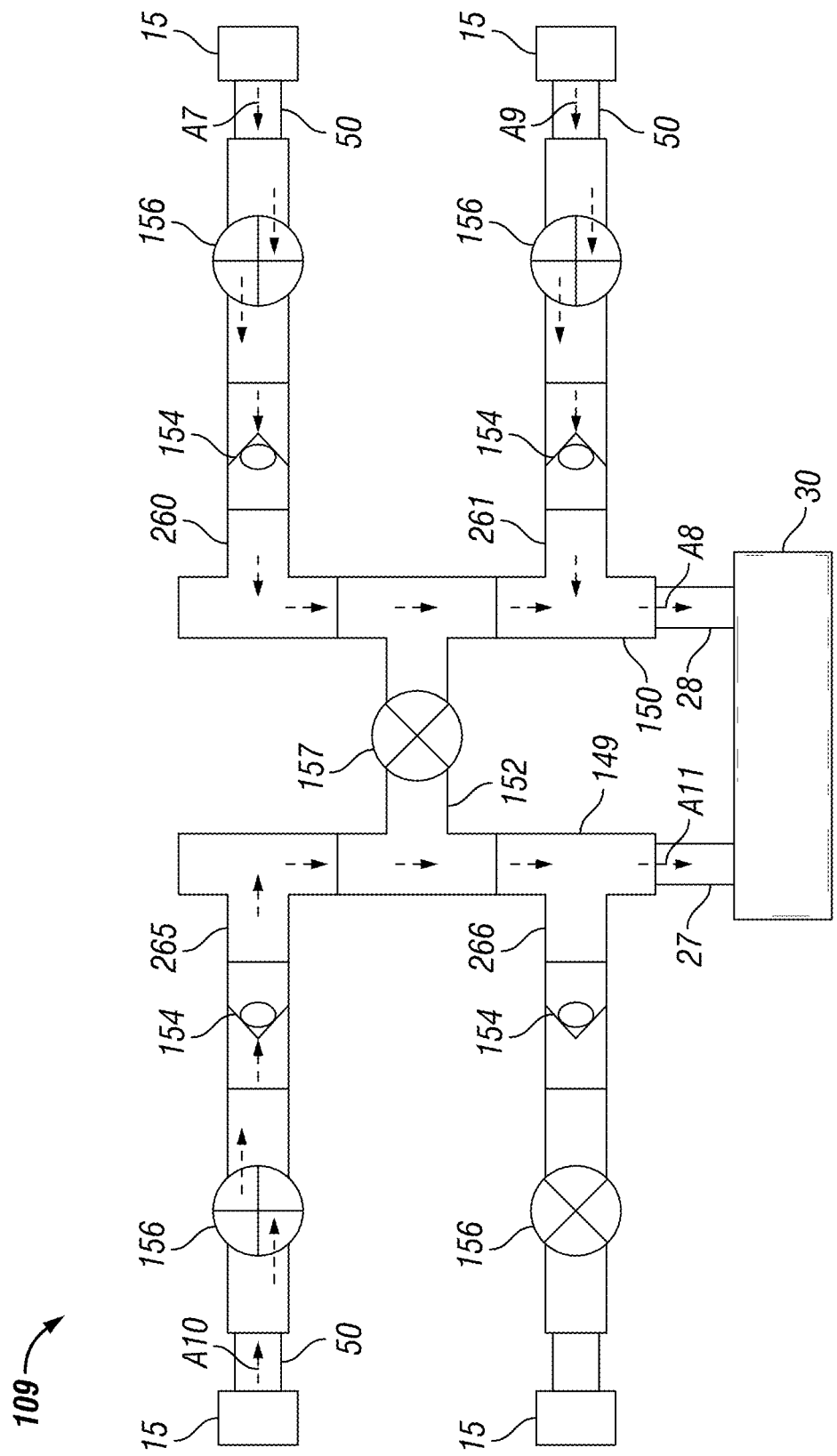
FIG. 16 is another simplified layout of high pressure treating iron of a manifold sub-assembly.

FIG. 16 illustrates exemplary fluid flow through the high pressure treating iron 109 including three of the four frac pump stations 260, 261, 265 set to an open position allowing high pressure fluid to flow (see Arrows A7, A9 and A10) from their corresponding frac pumps 15 to the left side primary line 149 and the right side primary line 150. As shown, the high pressure isolation valve 157 of the cross conduit 152 is set to a closed position. Accordingly, high pressure fluid flows from corresponding frac pumps 15 (see Arrows A7, A9) combining in the primary line 150 where the fluid is directed out from the manifold system 500 (Arrow A8) downstream toward a wellhead 30 for downhole fracturing of a well. Likewise, high pressure fluid (see Arrow A10) flows from a corresponding frac pump 15 through the frac pump station 265 into the left side primary line 149 where the fluid is directed out from the manifold system 500 (Arrow A11) and downstream toward wellhead 30 for downhole fracturing of a well. As shown, with the high pressure isolation valve 157 of the cross conduit 152 set to a closed position, high pressure fluid does not flow from the right side primary line 150 to the left side primary line 149.

Figure 17:
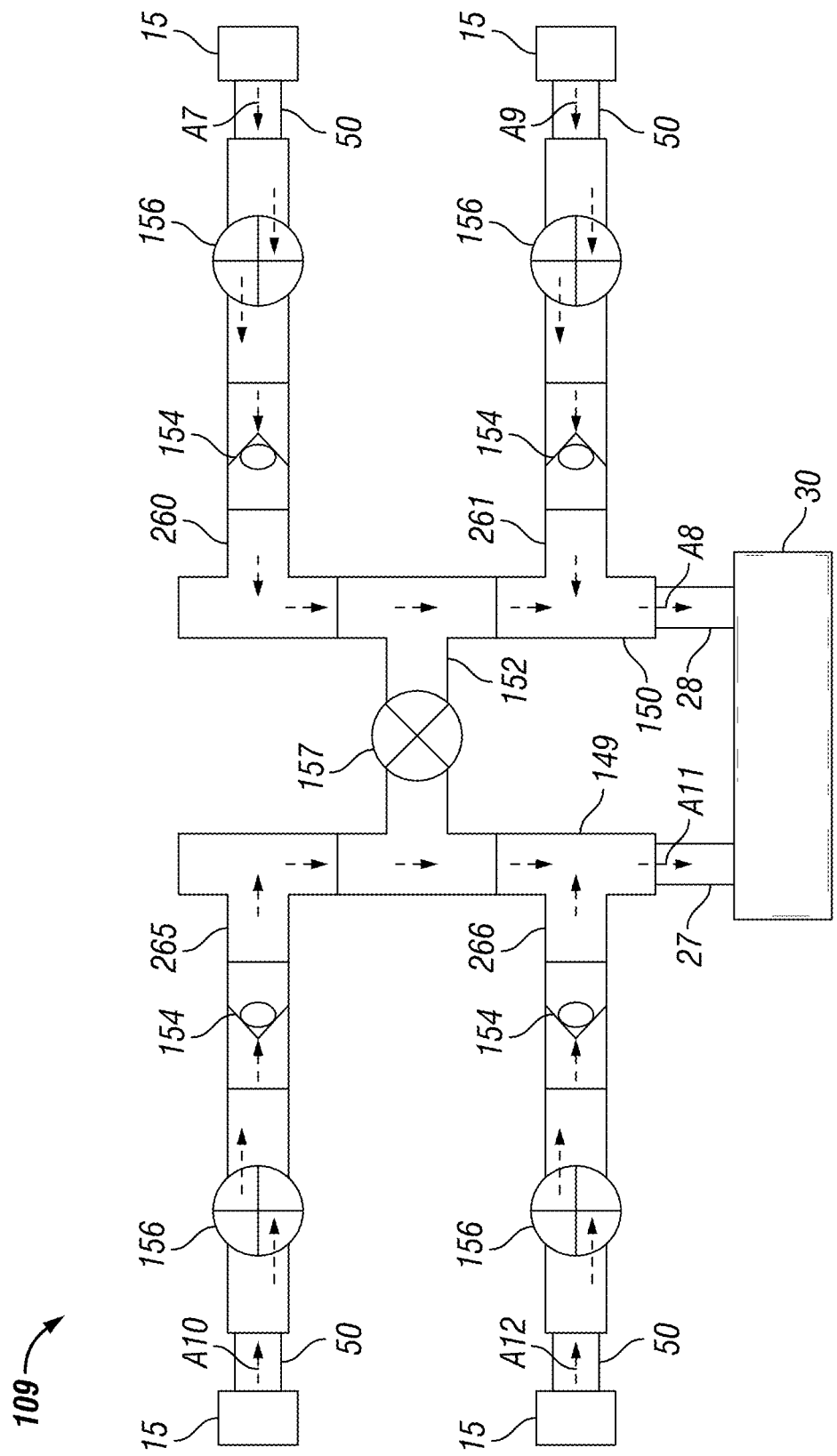
FIG. 17 is another simplified layout of high pressure treating iron of a manifold sub-assembly.
Figure 18:
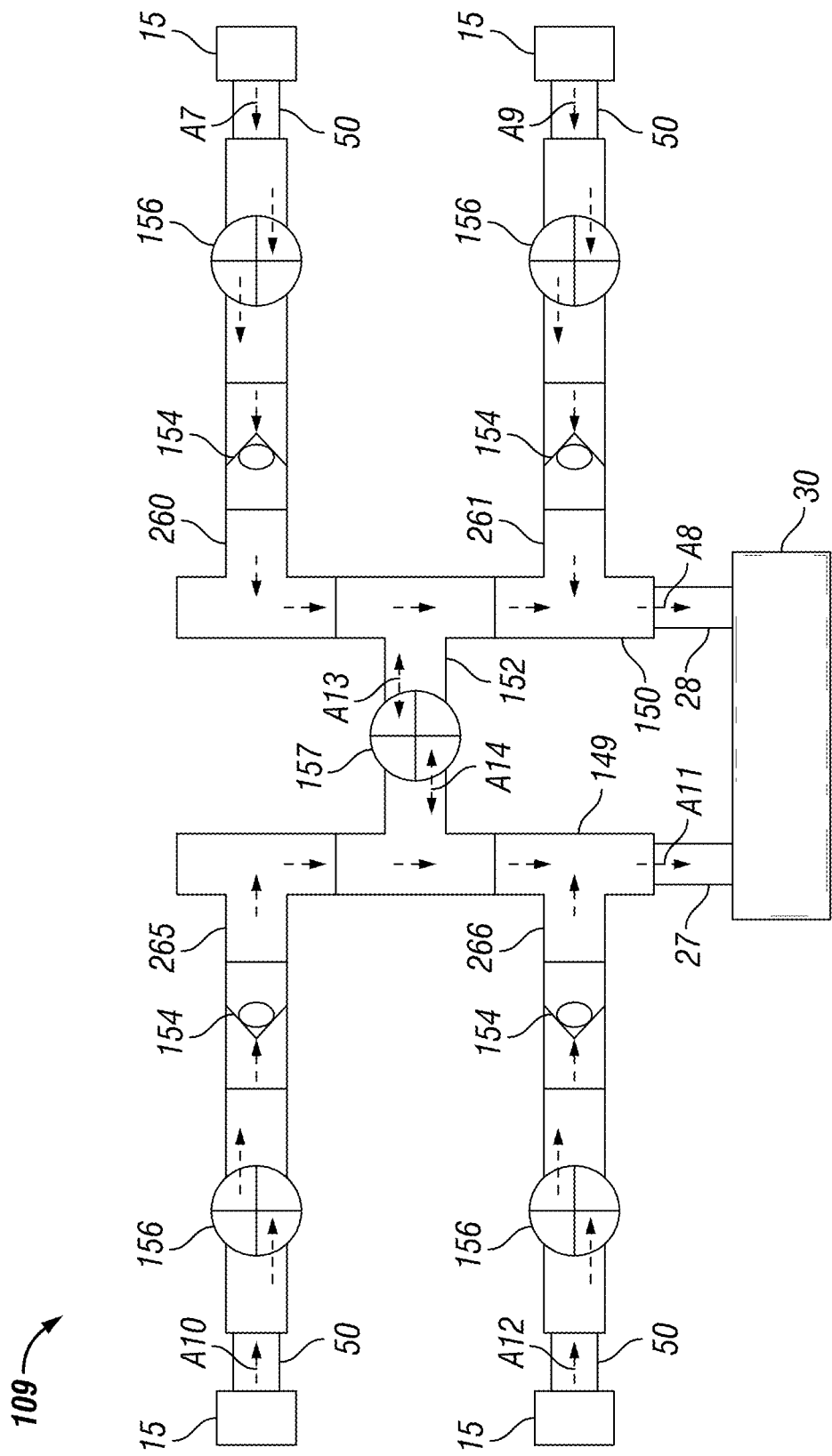
FIG. 18 is another simplified layout of high pressure treating iron of a manifold sub-assembly.

FIG. 17 illustrates exemplary fluid flow through the high pressure treating iron 109 including all four frac pump stations 260, 261, 265, 266 set to an open position allowing high pressure fluid to flow (see Arrows A7, A9, A10 and A12) from the corresponding frac pumps 15 to the left side primary line 149 and the right side primary line 150 respectfully with the high pressure isolation valve 157 of the cross conduit 152 set to a closed position. Accordingly, high pressure fluid flows from corresponding frac pumps 15 (see Arrows A7, A9) and combines in the primary line 150 and flows out from the manifold system 500 (Arrow A8) and downstream toward wellhead 30 for downhole fracturing of a well. High pressure fluid also flows from corresponding frac pumps 15 (see Arrow A10 and Arrow A12) and combines in the primary line 149 where the fluid flows out from the manifold system 500 (Arrow A11) and downstream toward wellhead 30 for downhole fracturing of a well. As shown, high pressure fluid does not flow from the right side primary line 150 to the left side primary line 149 or vice versa because the high pressure isolation valve 157 is set to a closed position. In an embodiment where the high pressure isolation valve 157 of the cross conduit 152 is set to an open position as shown in FIG. 18, high pressure fluid may flow from the right side primary line 150 to the left side primary line 149 and vice versa (see Arrows A13 and A14). As such, the high pressure isolation valve 157 may be referred to herein as a "diverting and isolation valve" because such valve allows fluid to be diverted from the right side primary line 150 to the left side primary line 149 and vice versa.

Figure 19:
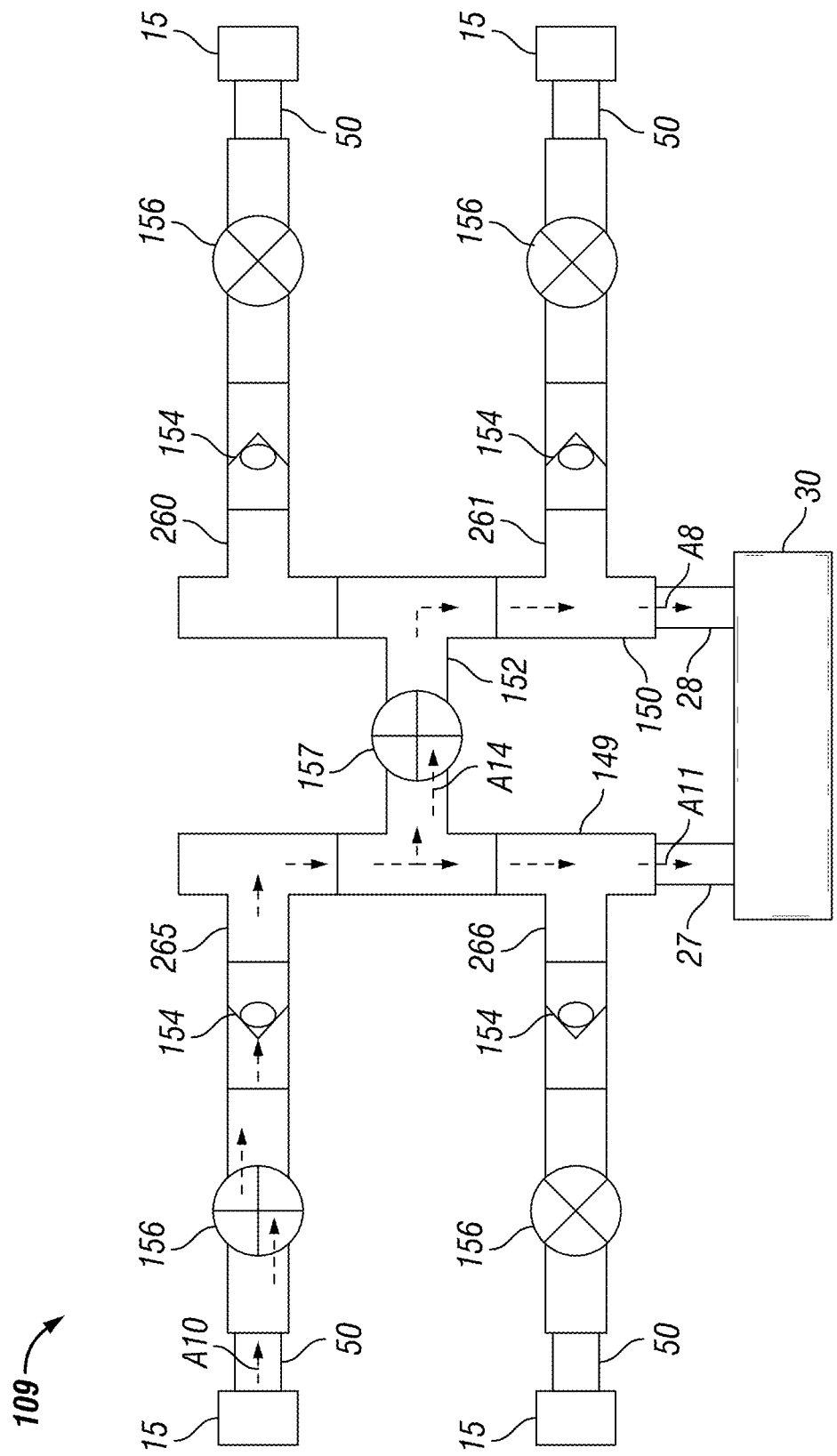
FIG. 19 is another simplified layout of high pressure treating iron of a manifold sub-assembly.

FIG. 19 illustrates exemplary fluid flow through a single pump station 265, through the left side primary line 149 and through the right side primary line 150 by diverting fluid through the cross conduit 152 by setting the high pressure isolation valve 157 to an open position (see Arrow 414).

Figure 20:
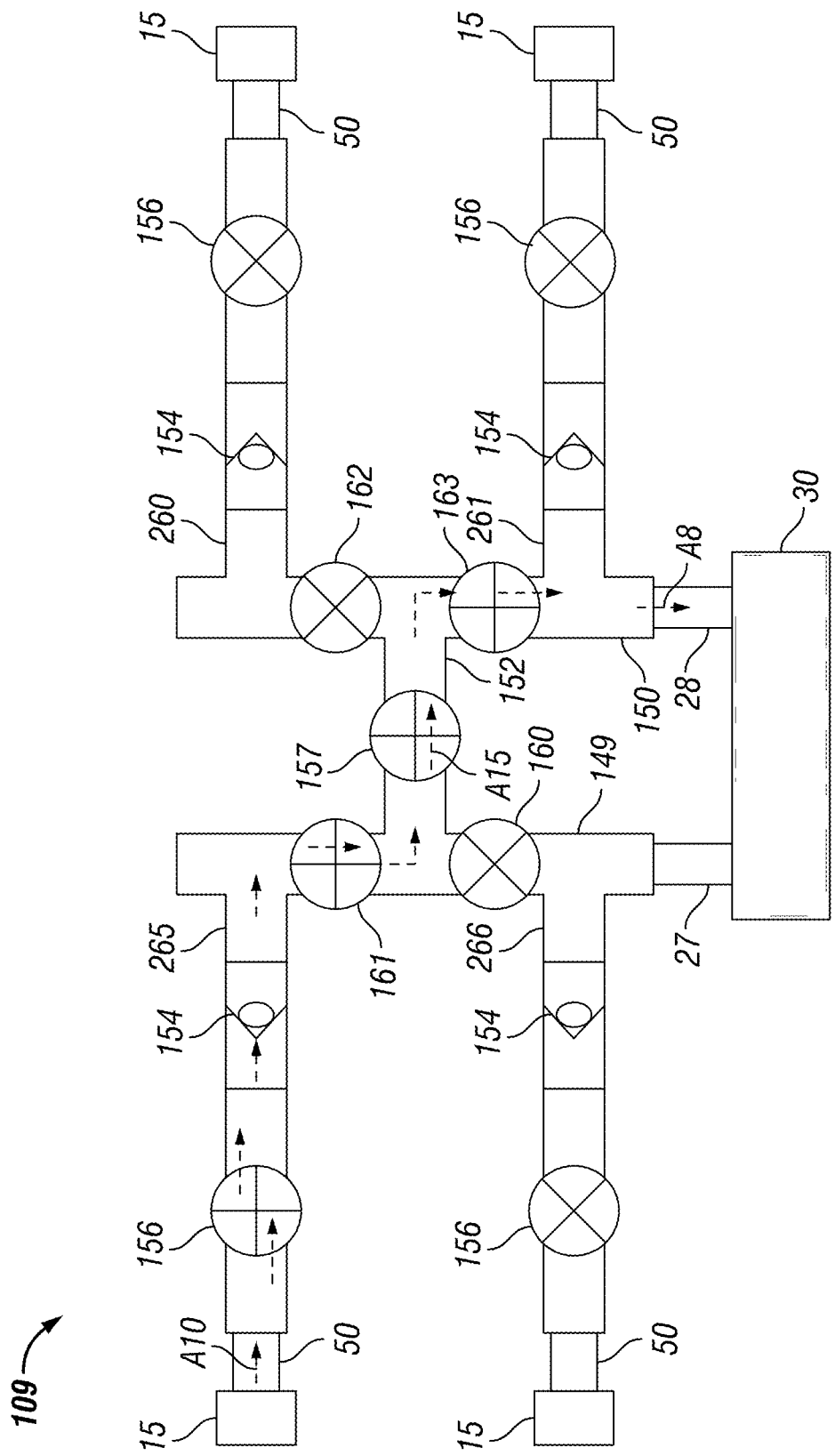
FIG. 20 is another simplified layout of high pressure treating iron of a manifold sub-assembly.

FIG. 20 is a simplified illustration showing how high pressure fluid may be diverted from one primary line to the other primary line via the cross conduit 152 for purposes of conveying high pressure fluid downstream toward a wellhead 30 for downhole fracturing of a well. In certain operations, one or more parts of a manifold may fail, break or leak requiring fluid to be diverted away from the damaged part of the manifold system, i.e., sealing off from fluid flow one or more sections of one or more primary lines. As shown in FIG. 20, if part of the left side primary line 149 is damaged downstream, the high pressure isolation valve 157 of the cross conduit 152 may be opened and a primary line valve 160 associated with frac pump station 266 may be set to a closed position promoting high pressure fluid flow through (1) the open primary line valve 161 and (2) the high pressure isolation valve 157 in order to divert fluid from frac pump station 265 to the right side primary line 150 (see Arrow A15) allowing high pressure fluid to be conveyed toward wellhead 30 for downhole fracturing of a well. As shown in this illustration, the primary line valve 162 is set to a closed position and primary line valve 163 is set to an open position allowing fluid to flow out of the right side primary line 150 toward wellhead 30. Without limiting the invention, apposite primary line valves 160-163 may include, but are not necessarily limited to SPM® brand plug valves commercially available from Weir Group PLC, headquartered in Glasgow, Scotland. Similar fluid diversion as described above is also applicable to the primary lines 134, 135 of the low pressure fluid conduit assembly 108.

Figure 21:
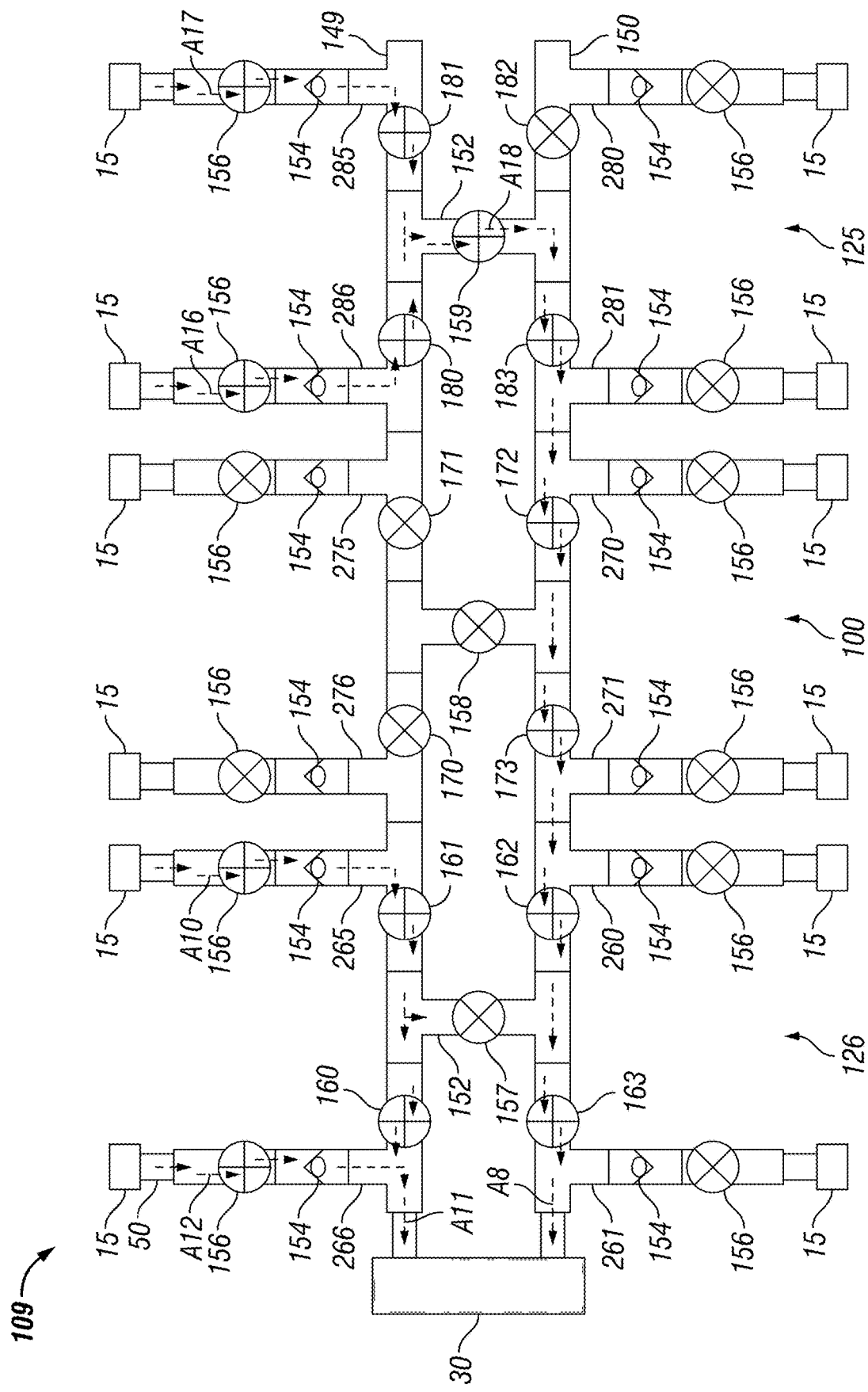
FIG. 21 is another simplified layout of high pressure treating iron of three manifold sub-assemblies of a manifold system.

FIG. 21 provides a simplified illustration of high pressure fluid flow through the left side primary line 149 and the right side primary line 150 of a twelve frac pump manifold system 500 including the bypassing of a section of the left side primary line 149. In this illustration, the manifold system 500 is configured for operation with a right hand pump bank and a left hand pump bank for a total of twelve frac pumps 15. As shown, high pressure fluid is received by the manifold system 500 via frac pumps of the left hand pump bank, namely, frac pump stations 265, 266, 285 and 286 (see Arrows A10, A12, A16 and A17). In a scenario where at least part of the left side primary line 149 of the manifold sub-assembly 100 is damaged, is being inspected or is in repair, the isolation valves 156 for frac pump stations 275 and 276, the primary line valves 170 and 171 and the isolation valve 158 may be set to a closed position to prevent high pressure fluid flow through the left side primary line 149 of manifold sub-assembly 100 including frac pump stations 275 and 276. In addition, a first high pressure isolation valve 159 of manifold sub-assembly 125 may be set to an open position allowing high pressure fluid to be routed over to the right side primary line 150 via cross conduit 152 (see Arrow A18). Suitably, primary line valves 162, 163, 172, 173 are set to an open position whereby high pressure fluid routed from the left side primary line 149 to the right side primary line 150 may continue to flow downstream through the manifold sub-assemblies 100 and 126 and out from the manifold system 500 (see Arrow A8) downstream toward wellhead 30 for downhole fracturing of a well. As further shown, the isolation valve 157 may also be set to an open position allowing high pressure fluid to be diverted back to the left side primary line 149 and out from the manifold system 500 (see Arrow A11) toward well head 30.

Suitably, the piping of the high pressure treating iron 109 for adjacent manifold sub-assemblies 100 of a manifold system 500 may be connected in a manner effective to provide a pressure tight connection. For example, in one embodiment piping may be operably communicated, i.e., secured, via connectors such as Hammer Unions and SPM® Safety Iron® connections provided with seal rings such as those commercially available from Weir Group PLC. As appreciated by the skilled artisan, SPM® Safety Iron® connections and the like include a seal mechanism covering both ends of the pipes to be connected. Once connected and with the seal in position, a two piece clamp may be placed about the seal and bolted together, thereby affixing the two individual pieces together maintaining a seal to prevent fluid loss and/or pressure loss at the connection or joint. As of the date of this application an SPM® Safety Iron® connection has a pressure rating up to 103.4 MPa (15,000.0 psi). The piping of the high pressure treating iron 109 may also include high pressure bolt and flange connections.

Figure 22:
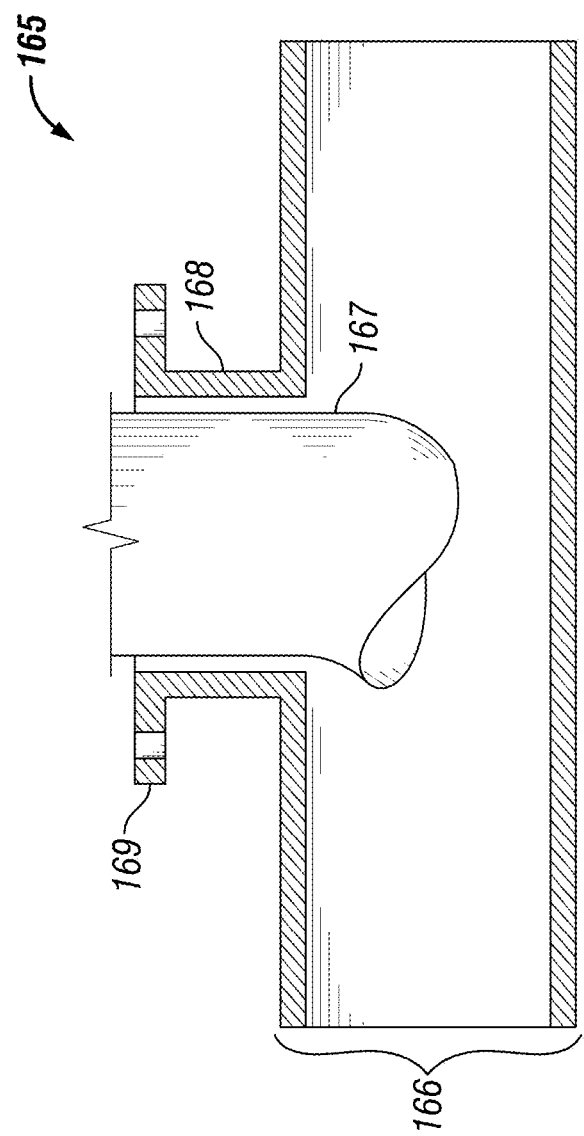
FIG. 22 is a partial sectional view of a Tee member of the application.

In addition, although the frac pump stations, e.g., 260, 261, 270, are shown at right angles, in one suitable embodiment one or more frac pump stations may be provided at a lateral angle ranging from about 20.0 degrees to about 45.0 degrees relative the primary lines 149 or 150 in a manner effective to diminish fluid flow stress of the high pressure treating iron 109 and/or prevent fouling. As shown in FIG. 22, the low pressure fluid conduit assembly 108 may also be provided with one or more fluid diversion connectors to diminish fluid flow stress and direct low pressure fluid from the primary lines 134, 135 to the frac pumps 15 or other location as desired. The fluid diversion connector or diversion Tee member 165 described herein may be employed for a variety of fluid discharge applications involving fluid or fluid/solid flow systems typically subject to excessive internal wear and tear as is common to right-angle discharge and lateral discharge ports.

Figure 23:
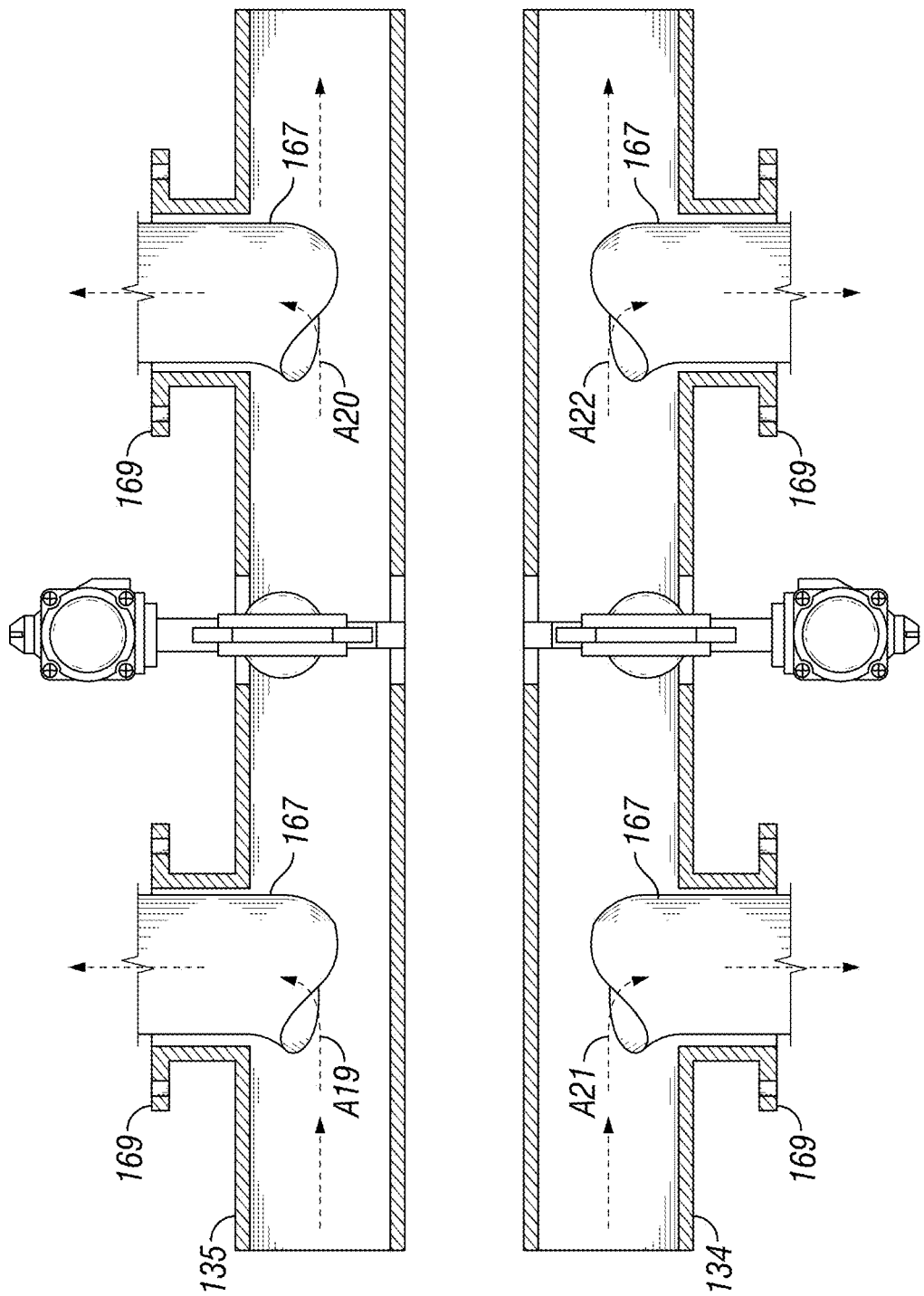
FIG. 23 is a representation of fluid flow of exemplary low pressure fluid conduit including the Tee member of FIG. 22.

In this embodiment, a Tee member 165 is provided with a removable internal wear member 167 ("internal wear insert") operationally configured to absorb a majority of the abrasion and/or erosion associated with low pressure fluid flow of fracturing fluids, e.g., clear fluid and/or fluids laden with solid particles such as sand. Suitably, the internal wear member 167 may be removed and replaced as desired. In one embodiment, the internal wear member 167 may attach to the Tee member 165 via a machined groove with a seal member such as an O-ring or equivalent. In another embodiment, the internal wear member 167 may be held in a fixed position by sandwiching at least part of the internal wear member 167 between flange 169 and an ANSI flange or the like bolted thereto. The primary conduit pipework 166 of the Tee member 165 is not limited in terms of construction. One suitable primary conduit pipework 166 may include eight inch schedule 40 or schedule 80 pipe or the metric equivalent constructed from stainless steel, aluminum, brass, titanium, mild steel, plastic, and combinations thereof. A suitable internal wear member 167 may include eight inch schedule 40 or schedule 80 pipe or the metric equivalent constructed from stainless steel, aluminum, brass, titanium, mild steel, plastic, and combinations thereof with a neck 168 and flange 169 (collectively referred to as an "outlet port") extending out there from. In one embodiment, the internal wear member 167 may be substantially straight. As shown in FIG. 22, the internal wear member 167 may extend into the primary conduit pipework 166 and include a curved portion facing upstream fluid flow in a manner effective to divert or direct fluid flow out from the outlet port of the Tee member 165. The curved portion of the internal wear member 167 may include a bend from about zero to ninety degrees. In one embodiment, the neck 168 may be an eight inch schedule 40 or schedule 80 pipe or the metric equivalent constructed from stainless steel, aluminum, brass, titanium, mild steel, plastic, and combinations thereof. The length of the neck 168 may vary according to the dimensions of corresponding piping for operation in conjunction with the Tee member 165. A suitable flange 169 may include, but is not necessarily limited to an ANSI 150 pound eight bolt flange as known by the skilled artisan in pipe fittings or its metric equivalent. Examples of low pressure fluid flow being diverted using the Tee member 165 is depicted in FIG. 23—see Arrows A19, A20, A21, A22 depicting diverted fluid flow.

In another embodiment, one or more manifold sub-assemblies 100 forming a manifold system 500 may be equipped with one or more flow meters on the low pressure side and/or one or more flow meters on the high pressure side. Also, one or more densometers may be employed to measure the density of the fluid flowing through a manifold sub-assemblies 100 and/or the manifold system 500. As stated above, measurements from flow meters and/or densometers may be collected remotely. In another embodiment, ultrasonic material thickness measuring devices or equivalent may be placed in one or more desired locations of the manifold system 500 in order to monitor wear rates at specific areas of the manifold sub-assemblies 100.

Figure 24:
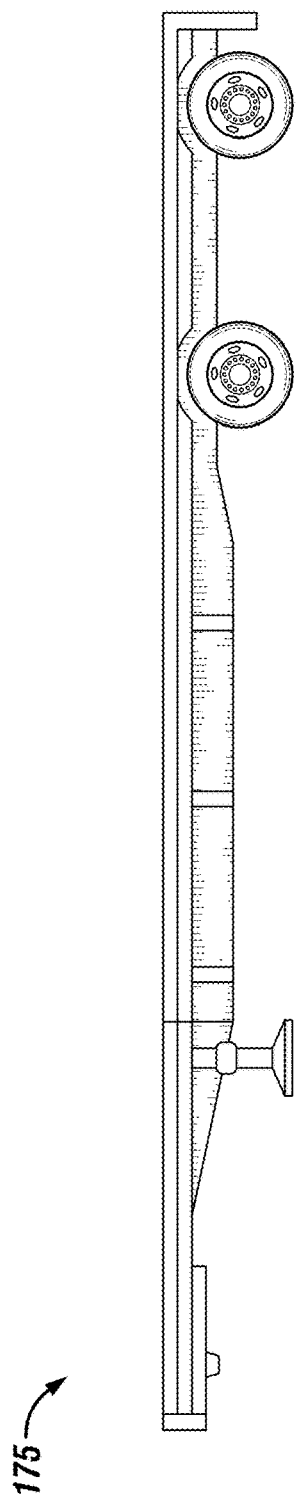
FIG. 24 is a side view of an exemplary flatbed trailer in a fully retracted position.
Figure 25:
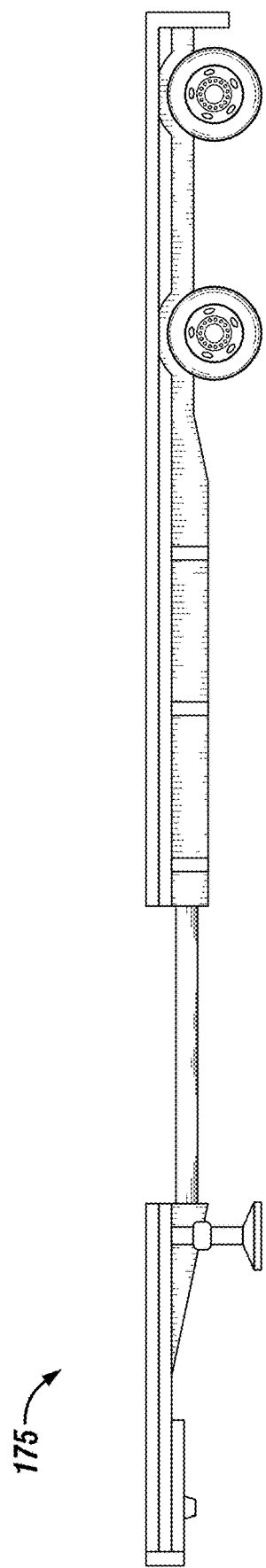
FIG. 25 is a side view of an exemplary flatbed trailer in a fully extended position.
Figure 26:
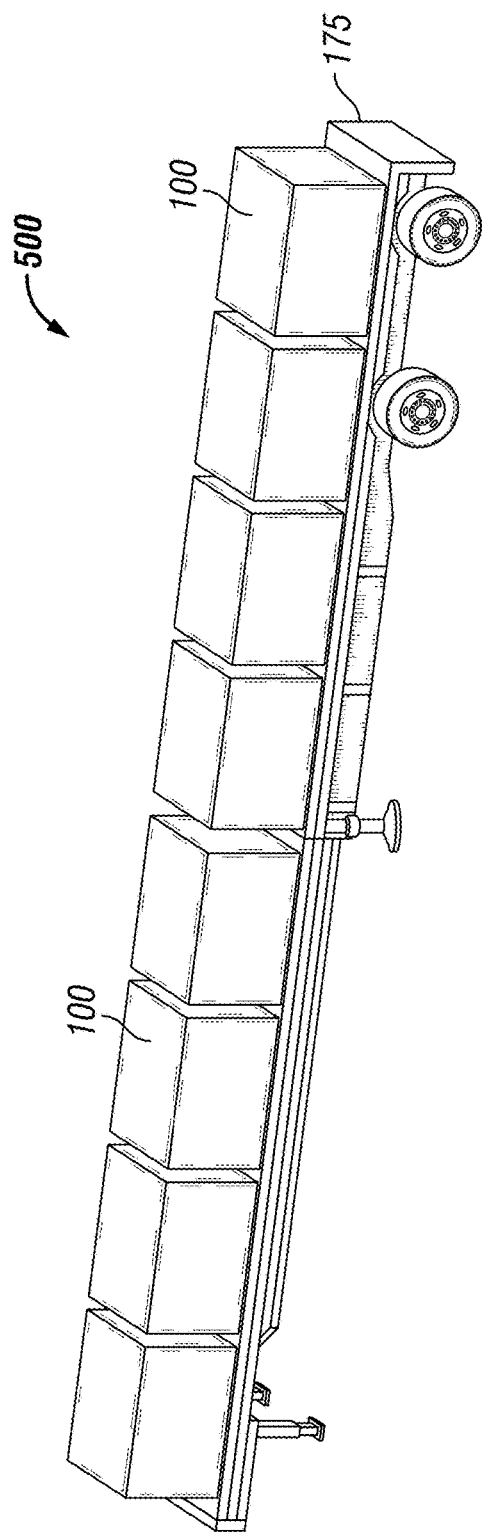
FIG. 26 is a perspective view of a manifold system including a fully extended flatbed trailer with eight manifold sub-assemblies.
Figure 27:
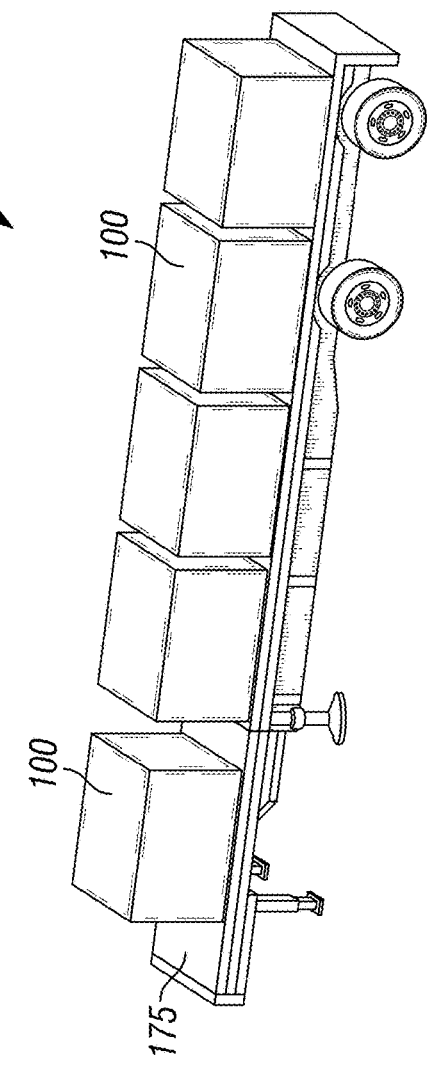
FIG. 27 is a perspective view of a manifold system including a fully retracted flatbed trailer with five manifold sub-assemblies.
Figure 28:
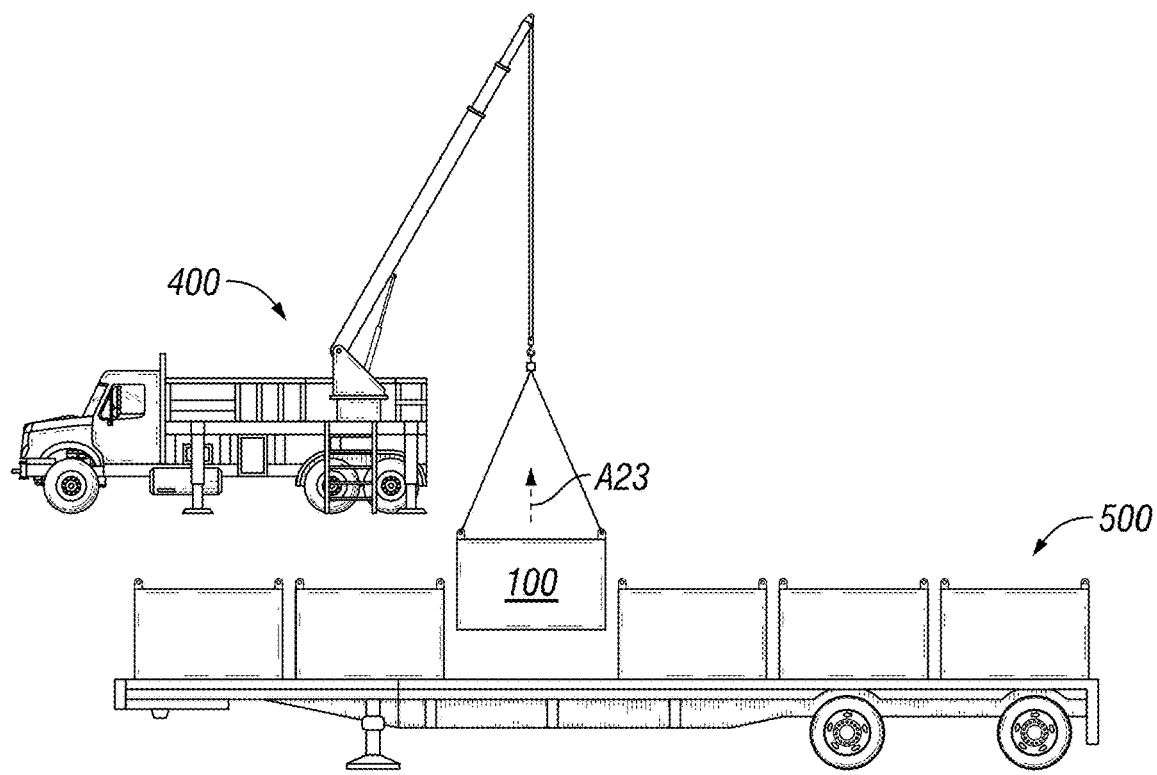
FIG. 28 is a simplified illustration showing a manifold sub-assembly being removed from a manifold system.

With attention to FIGS. 24-25, the assembly of the present manifold system 500 is advantageous in that the manifold system 500 may be transported and/or operated on an expandable flatbed type trailer 175. One suitable expandable flatbed trailer 175 for hydraulic fracturing operations may include a retracted length of about 14.6 meters (about 48.0 feet) and a fully expanded length of about 27.7 meters (about 91.0 feet). Without limiting the height of a suitable trailer 175, one suitable trailer 175 may have a height of about 1.5 meters (about 58.0 inches). With respect to an embodiment of a four frac pump station manifold sub-assembly 100 for hydraulic fracturing operations, a suitable trailer 175 may be operationally configured to carry at a minimum one manifold sub-assembly 100 and at a maximum up to eight manifold sub-assemblies 100 when the trailer 175 is in a fully expanded position for providing a thirty-two frac pump manifold system 500 as shown FIG. 26. As seen in FIG. 27, a trailer 175 set at a fully retracted position may be operationally configured to carry a maximum of five four frac pump station manifold sub-assemblies 100. Other size trailers 175 having different fully retracted and fully expanded lengths are herein contemplated for use, which may change the total number of manifold sub-assemblies 100 that may be carried by such trailer 175. Likewise, the size of individual sub-assemblies 100 may vary, which changes the maximum and minimum number of sub-assemblies 100 that the trailer 175 of FIGS. 26-27 can carry.

Similar as other trailers used on current roads and highways, a trailer 175 for use herein may include one or more types of axle systems, suspensions, brakes, tires, auto tire inflation system, and the like. One suitable axle including ride suspension is commercially available from Meritor Heavy Vehicle Systems, L.L.C., Troy, Mich., U.S.A.

Turning to FIGS. 28-31, the present invention provides manifold sub-assemblies 100 operationally configured to be connected for use as an operational manifold system 500 whereby operators may remove one or more individual manifold sub-assemblies 100 out from the manifold system 500 for disposal, maintenance and/or inspection purposes (see the lifting crane 400) and replace only those manifold sub-assemblies 100 that were removed. As depicted, in an embodiment of a manifold system 500 having six manifold sub-assemblies 100 where any one manifold sub-assembly 100 requires removal from operation a user may detach the low pressure fluid conduit assembly 108 and the high pressure treating iron 109 of the removable manifold sub-assembly 100 from the adjacent manifold sub-assembly or assemblies 100 and thereafter remove the target manifold sub-assemblies 100 out from the remaining manifold system 500 (see Arrow A23 in FIG. 28) for replacement by another manifold sub-assembly 100.

Figure 29:
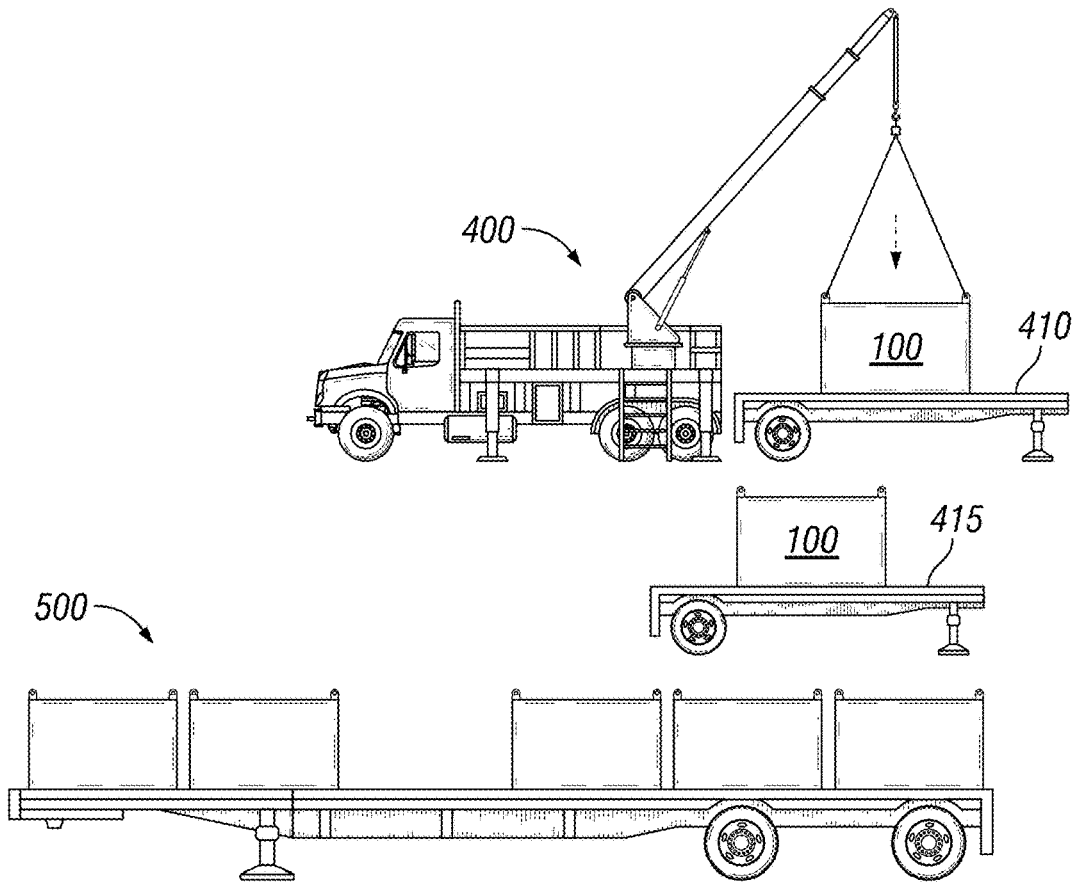
FIG. 29 is a simplified illustration illustrating the replacement of the manifold sub-assembly of FIG. 28 with a replacement manifold sub-assembly.
Figure 30:
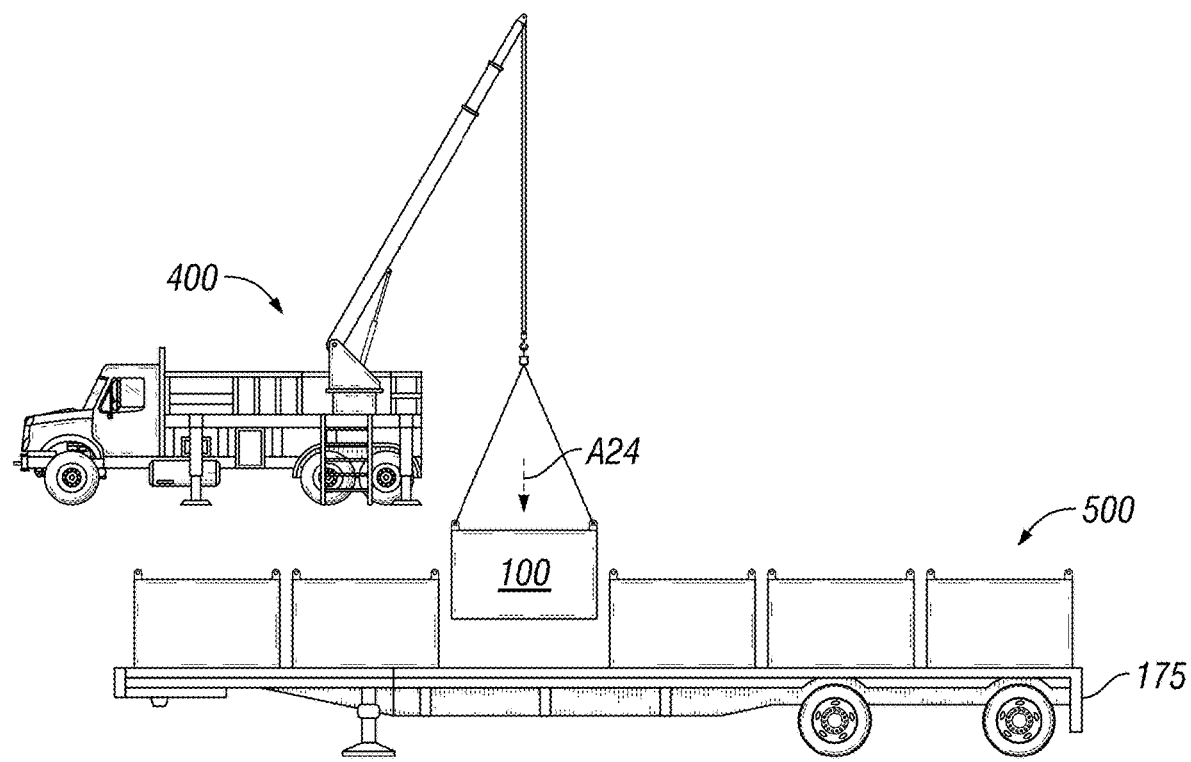
FIG. 30 is a simplified illustration showing the replacement manifold sub-assembly of FIG. 29 being inserted into the manifold system of FIG. 28.
Figure 31:
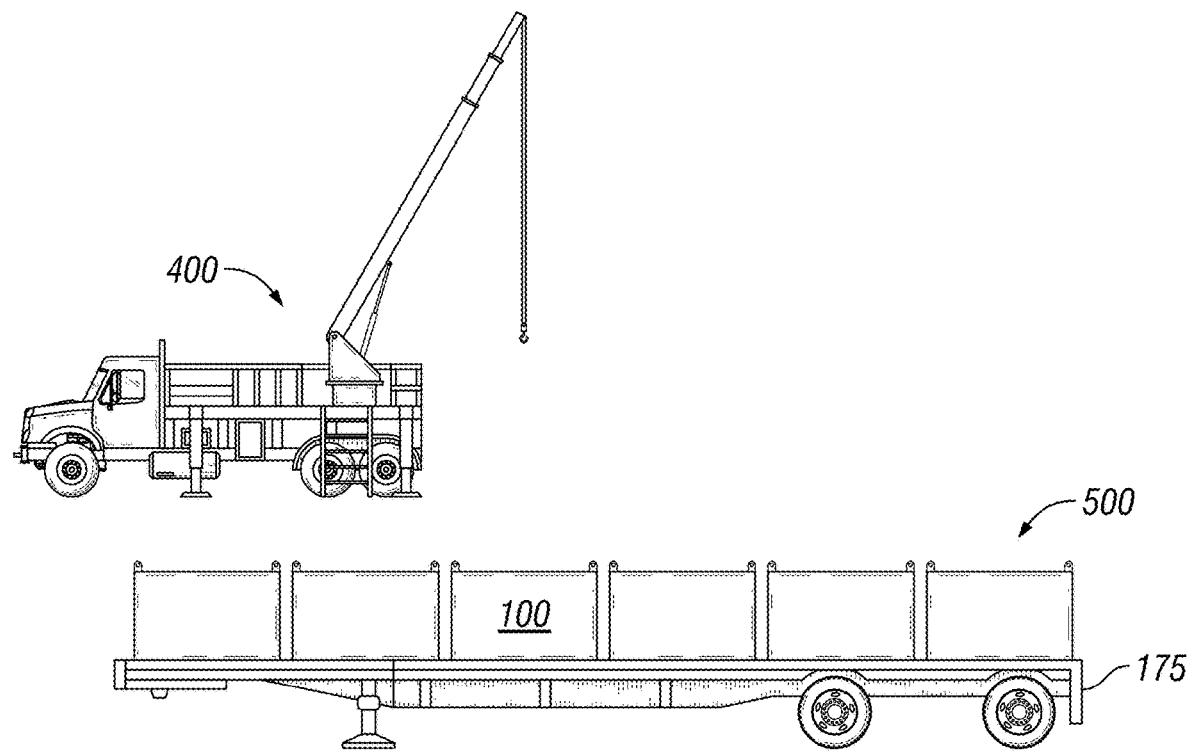
FIG. 31 is a simplified illustration showing the replacement manifold sub-assembly of FIG. 29 in an operable position as part of the manifold system of FIG. 28.

As shown in FIG. 29, once a particular manifold sub-assembly 100 is removed from the manifold system 500 it may be set aside or placed on a flatbed 410 or the like for transport from the well site. Thereafter, a replacement manifold sub-assembly 100 (see the manifold sub-assembly 100 on flatbed 415) may be used as a replacement manifold sub-assembly 100 (see Arrow A24 in FIG. 30). Once the replacement manifold sub-assembly 100 is set in place on the trailer 175 (see FIG. 31), the low pressure fluid conduit assembly 108 and the high pressure treating iron 109 may be fluidly connected to the replacement manifold sub-assembly 100 and the manifold system 500 may proceed with further operation.

Figure 32:
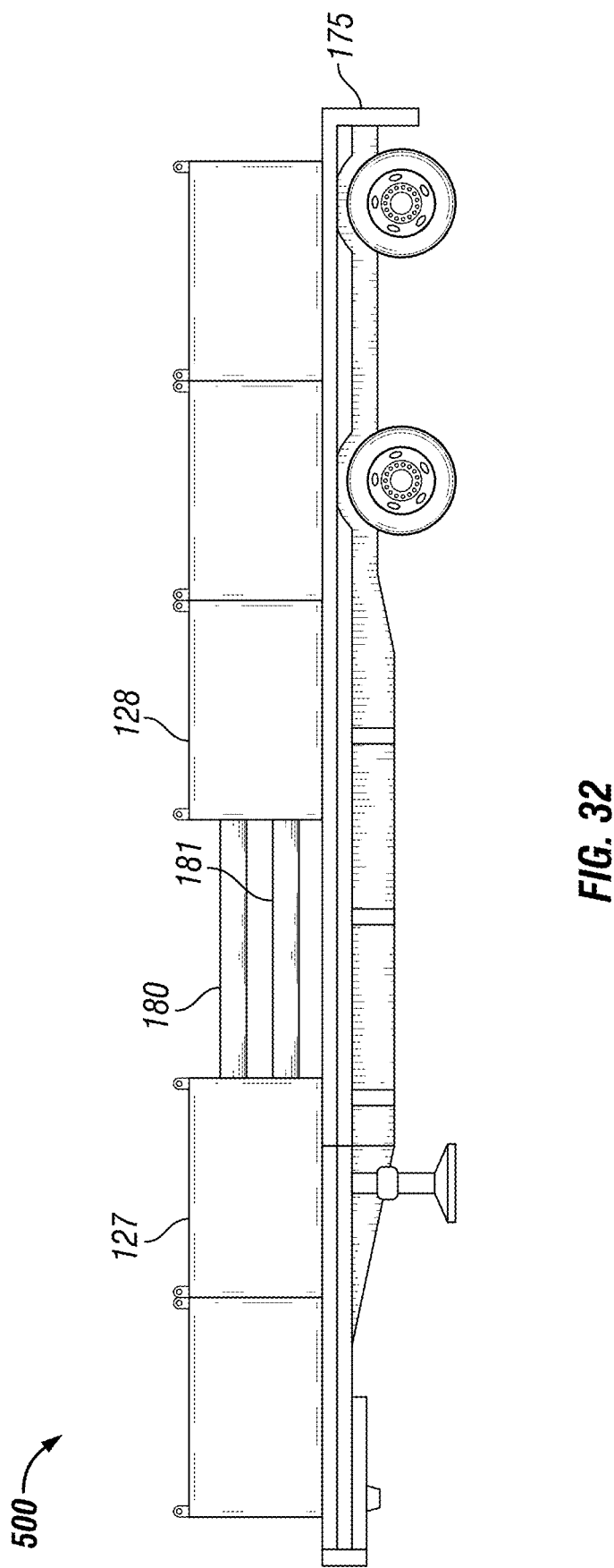
FIG. 32 is a side view of another embodiment of a manifold system.

In still another embodiment as shown in FIG. 32, once a manifold sub-assembly 100 is removed from operation as shown in FIG. 29, rather than replacing the removed manifold sub-assembly 100 as described above, the manifold system 500 may be made operational by operably communicating, i.e., fluidly connecting target manifold sub-assemblies such as manifold sub-assembly 127 and manifold sub-assembly 128 as shown. In this embodiment, the low pressure fluid conduit assembly 108 and the high pressure treating iron 109 of manifold sub-assembly 127 and manifold sub-assembly 128 are operably communicated via low pressure conduit or low pressure piping 180 and high pressure conduit or high pressure piping 181 using connectors as described above. This type of operable communication may be performed at multiple points along a manifold system 500 as required. Likewise, the distance between target sub-assemblies to be fluidly connected is not limited to any particular distance and do not have to be arranged inline as shown in FIG. 32.

Referring now to FIGS. 33-35, it is further contemplated that multiple manifold systems 500 may be fluidly connected in series to provide a larger manifold system 600 for a particular hydraulic fracturing operation. As shown in FIG. 33, in one suitable mode of operation two flatbed trailers 175 may be backed into place rear to rear whereby the terminal manifold sub-assemblies 125 on each trailer 175 may be fluidly connected with piping similar as described in reference to FIG. 32. As FIGS. 34 and 35 illustrate, the two trailers 175 may also be aligned front to back as shown in FIG. 34 or aligned front to front as shown in FIG. 35.

Figure 36:
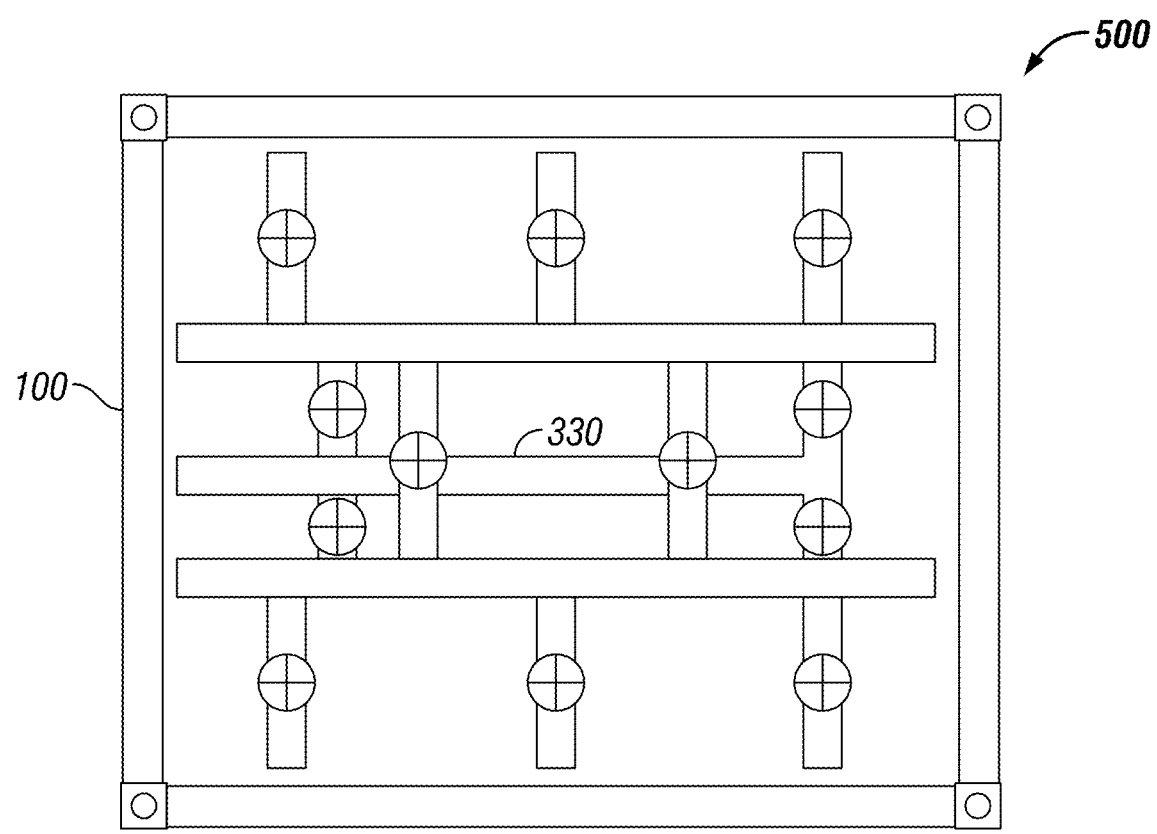
FIG. 36 is another simplified embodiment of a manifold sub-assembly including a dedicated high pressure bypass line.

Turning to FIG. 36, in another embodiment the high pressure treating iron 109 of each of the manifold sub-assemblies 100 may include a dedicated high pressure bypass line 330 or "belly line" that may be located and oriented as desired. In the embodiment of FIG. 36, the dedicated high pressure bypass line 330 is set below the low pressure fluid conduit assembly 108. In one suitable embodiment, a high pressure bypass line 330 may be employed for corrosion preventative measures by providing an alternate flow line for corrosive fluids through the manifold system 500 preventing corrosive fluids from flowing through the primary lines 149, 150 of the high pressure treating iron 109. Suitable high pressure treating iron for routing corrosive fluids rates to maximum allowable working pressure up to about 103.4 MPa (15,000 psi) and may be constructed from mild steel and specific alloys. Suitable high pressure treating iron for routing corrosive fluids is commercially available from sources such as Weir Group PLC and FMC Technologies, Inc.

In one aspect, the application provides a manifold system including (1) a plurality of original manifold sub-assemblies 100 operationally configured to be fluidly connected to one another, (2) an extendable flatbed trailer 175 operationally configured to support the plurality of manifold sub-assemblies 100 thereon, and (3) one or more backup or reserve manifold sub-assemblies 100 for future use as replacements for one or more original manifold sub-assemblies 100.

The manifold sub-assembly 100 of this application may also be fitted with one or more rupture discs or "burst-discs," operationally configured to rupture when the fluid pressure inside the high pressure treating iron 109 gets close to, reaches or exceeds the maximum allowable working pressure of the high pressure treating iron 109 in order to release the built-up pressure within the high pressure treating iron 109. A burst-disc is a safety feature that prevents the high pressure treating iron 109 from being exposed to abnormally high pressures causing a catastrophic failure of the high pressure treating iron 109. As understood by the skilled artisan, burst discs may be fitted on either the high pressure treating iron 109, the low pressure fluid conduit assembly 108, or both. The manifold sub-assembly 100 of this application may also be fitted with one or more pressure relief valves, operationally configured to open when the fluid pressure inside the high pressure treating iron 109 gets close to, reaches or exceeds the maximum allowable working pressure of the high pressure treating iron 109 in order to release the built-up pressure within the high pressure treating iron 109. As understood by the skilled artisan, a pressure relief valve is a safety feature that prevents the high pressure treating iron 109 from being exposed to abnormally high pressures causing a catastrophic failure of the high pressure treating iron 109. The pressure relief valve may include a spring style pressure relief valve or a hydraulic style pressure relief valve. Either style of pressure relief valve may have the relief pressure set as desired. In addition, both styles of pressure relief valve are suitably self-resetting, which means that after the pressure has been released via opening of the valve, the pressure relief valve suitably closes and is reset back to its original operating relief pressure setting. One exemplary pressure relief valve is commercially available from Weir Group PLC under the SPM® line of pressure pumping equipment, e.g., a two inch, 15,000.0 psi rated pressure relief valve.

The high pressure treating iron 109 may also be fitted with one or more inline high pressure flow meters as commercially available and known in the art. Suitable flow meters may be placed along any section of the high pressure treating iron 109, where fluid flow measurement may be required or desired. Suitable flow meters may also provide a totalizer, where user(s) can see exactly how much fluid has passed through the flow meter providing the total volume of fluid pumped through that section of high pressure treating iron 109. Likewise, the low pressure fluid conduit assembly 108 may also be fitted with one or more in-line high pressure flow meters. Such meters may be operably communicated with the control system of the manifold system 500 as discussed above.

Due to the nature of use of the low pressure fluid conduit assembly 108 and high pressure treating iron 109, the large volumes of fluids and solids that are pumped through the low pressure fluid conduit assembly 108 and the high pressure treating iron 109, wear and tear of the manifold system 500 is certainly realized. As understood by the skilled artisan, preventative maintenance inspections may be periodically carried out on both the low pressure fluid conduit assembly 108 and the high pressure treating iron 109. As part of such inspections, an inspector will most likely measure the wall thickness of the base metal of the conduits of the low pressure fluid conduit assembly 108 and/or the high pressure treating iron 109. This type of measurement helps to determine the amount of material remaining, i.e., the remaining wall thickness, of a particular conduit. When compared to its original state, such measurement provides insight into the amount of material that has been eroded or removed from a conduit in question. However, this type of measurement is often time consuming requiring the manifold system 500 to be shut off resulting in zero pressure of the manifold system 500. An alternative feature is to strategically place real time thickness measurement devices, such as ultrasonic thickness measurement devices, at key high wear sections in both the low pressure fluid conduit assembly 108 and the high pressure treating iron 109. The collected data can be live fed back to a central control station, either via a hard-wired connection and/or a wireless connection, thus detailing exact material wall thickness of targeted conduit(s) of the low pressure fluid conduit assembly 108 and the high pressure treating iron 109. The manifold system 500 may also be provided with one or more audible alarms or visible alarms communicated with the control circuitry as desired.

The invention will be discussed with reference to the following non-limiting examples, which are illustrative only and not intended to limit the present invention to a particular embodiment.

EXAMPLE 1

Figure 37:
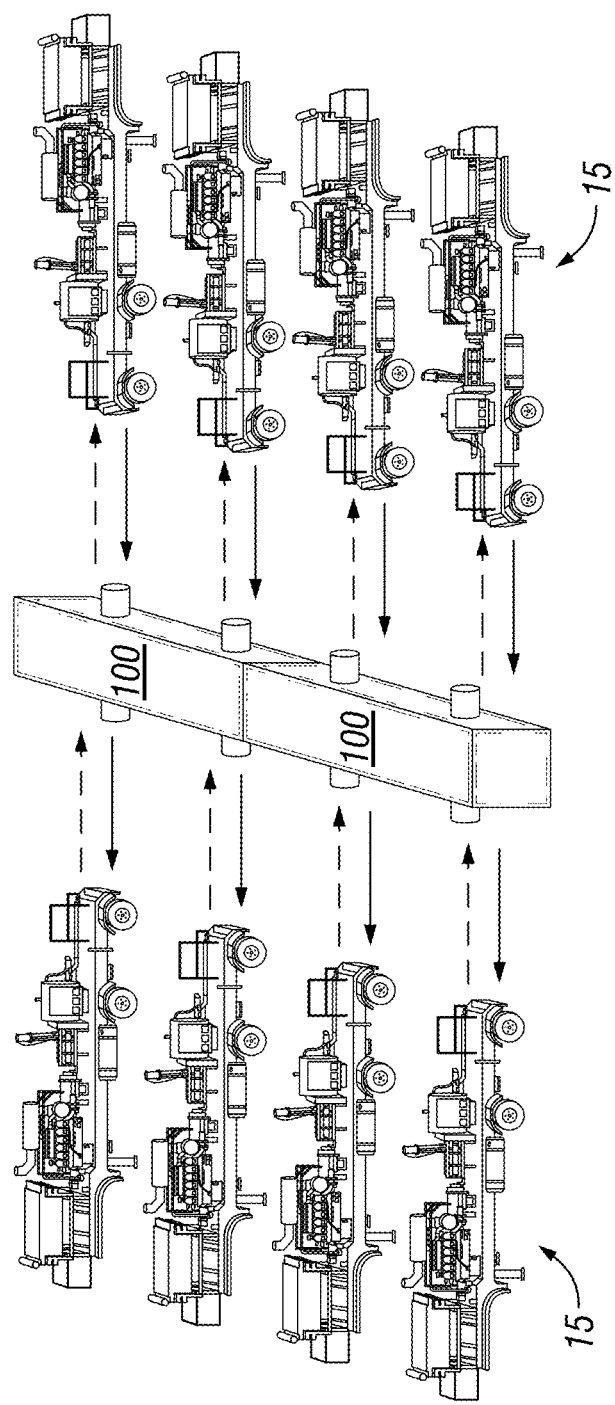
FIG. 37 is a simplified layout of a manifold system for use with a right hand. pump bank having four hydraulic fracturing pumps and a left hand pump bank having four hydraulic fracturing pumps.

In a first non-limiting example, a manifold system 500 as shown in FIG. 37 is provided for use with a right hand pump bank having four hydraulic fracturing pumps and a left hand pump bank having four hydraulic fracturing pumps. In this embodiment, a total of two four pump count (or two "four frac pump station") manifold sub-assemblies 100 are assembled to provide a manifold system 500 for operation with a total of eight hydraulic fracturing pumps at a well site.

EXAMPLE 2

Figure 38:
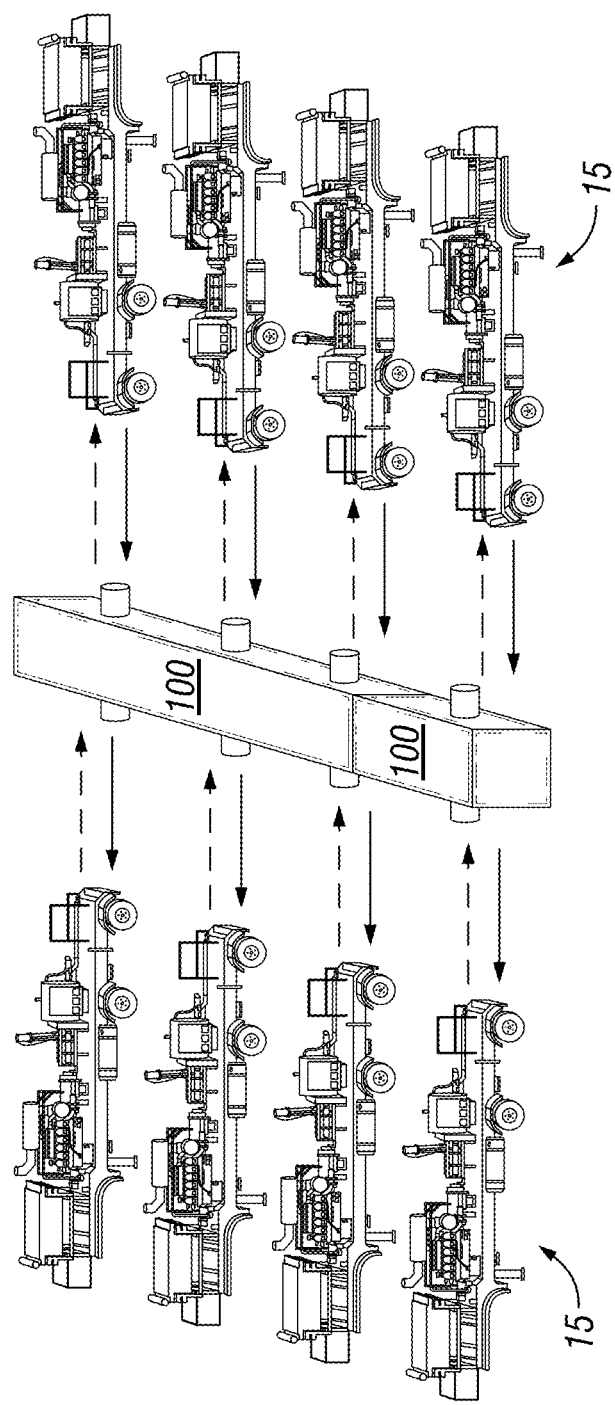
FIG. 38 is another simplified layout of a manifold system for use with a right hand pump bank having four hydraulic fracturing pumps and a left hand pump bank having four hydraulic fracturing pumps.

In a second non-limiting example, a manifold system 500 as shown in FIG. 38 is provided for use with a right hand pump bank having four hydraulic fracturing pumps and a left hand pump bank having four hydraulic fracturing pumps. In this embodiment, one six pump count ("six frac pump station") manifold sub-assembly 100 is assembled with one two pump count ("two frac pump station") manifold sub-assembly 100 to provide a manifold system 500 for operation with a total of eight hydraulic fracturing pumps at a well site.

EXAMPLE 3

Figure 39:
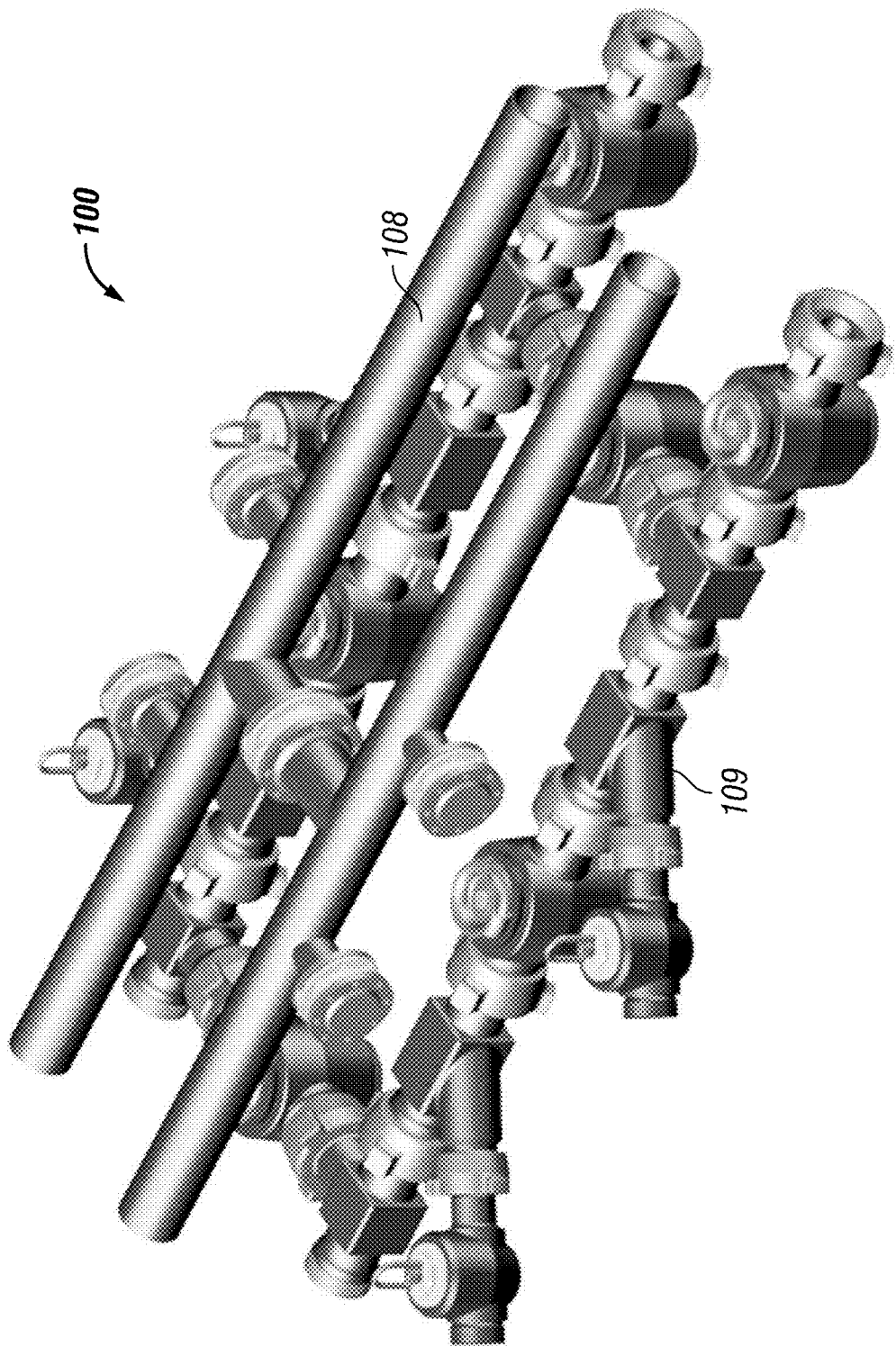
FIG. 39 is another simplified illustration of an embodiment of a manifold sub-assembly.

In a third non-limiting example, a four pump count manifold sub-assembly 100 as shown in FIG. 39 is provided. The manifold sub-assembly 100 may be secured to a framework 105 or the manifold sub-assembly 100 may be mounted to a chassis.

EXAMPLE 4

In a fourth non-limiting example, two four pump count manifold sub-assemblies 100 as shown in FIG. 37 are provided for use as a manifold system 500 with a right hand pump bank having four hydraulic fracturing pumps and a left hand pump bank having four hydraulic fracturing pumps. Each manifold sub-assembly 100 includes a framework 105. The framework 105 of each sub-assembly 100 has the following dimensions:

Height: about 1.73 meters (about 68.0 inches);
Length: about 3.05 meters (about 120.0 inches);
Width: about 2.44 meters (96.0 inches).

It is believed that the invention of the present application and advantages will be understood by the foregoing description. Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

I claim:

1. A manifold system including:
at least a first manifold sub-assembly including a low pressure fluid conduit assembly for directing low pressure fluid to one or more target low pressure fluid destinations and a high pressure fluid conduit assembly for receiving high pressure fluid from one or more sources of high pressure fluid, wherein the low pressure fluid conduit assembly has two or more primary flow lines in controlled fluid communication and the high pressure fluid conduit assembly has two or more primary flow lines in controlled fluid communication, each primary flow line having an outlet for the high pressure fluid; wherein the low pressure fluid conduit assembly includes one or more diverting and isolation valves operationally configured to control the flow of fluid between the primary flow lines of the low pressure fluid conduit assembly and wherein the high pressure fluid conduit assembly includes one or more diverting and isolation valves operationally configured to control the flow of fluid between the primary flow lines of the high pressure fluid conduit assembly and a dedicated high pressure bypass line.

2. The manifold system of claim 1 wherein the first manifold sub-assembly is supported by a framework.

3. The manifold system of claim 2 including a second manifold sub-assembly supported by a framework releasably securable to the framework of the first manifold sub-assembly.

4. The manifold system of claim 1 wherein the low pressure fluid conduit assembly includes one or more fluid diversion connectors fitted with a removable internal wear member operationally configured to direct low pressure fluid from the low pressure fluid conduit assembly to the one or more target low pressure fluid destinations.

5. The manifold system of claim 1 wherein the one or more target low pressure fluid destinations includes one or more hydraulic fracturing pumps at a well site and the low pressure fluid conduit assembly includes one or more frac pump stations.

6. The manifold system of claim 5 wherein the one or more sources of high pressure fluid includes the one or more hydraulic fracturing pumps and the high pressure fluid conduit assembly includes one or more frac pump stations.

7. The manifold system of claim 6 wherein the number of frac pump stations of the low pressure fluid conduit assembly ranges from two frac pump stations to eight frac pump stations and the number of frac pump stations of the high pressure fluid conduit assembly ranges from two frac pump stations to eight frac pump stations.

8. The manifold system of claim 1 wherein the low pressure fluid conduit assembly includes one or more isolation valves operationally configured to control the flow of fluid through the low pressure fluid conduit assembly and one or more high pressure check valves operationally configured to prevent the flow of high pressure fluid into the low pressure fluid conduit assembly, and wherein the high pressure fluid conduit assembly includes one or more isolation valves operationally configured to control the flow of fluid through the high pressure fluid conduit assembly.

9. The manifold system of claim 8 wherein each of the one or more diverting and isolation valves and the one or more isolation valves include an actuator operationally configured for remote operation of each of the one or more diverting and isolation valves and the one or more isolation valves.

10. The manifold system of claim 8 wherein the one or more diverting and isolation valves and the one or more isolation valves of the low pressure fluid conduit assembly are operationally configured to seal off one or more sections of one or more primary lines of the low pressure fluid conduit assembly and wherein the one or more diverting and isolation valves and the one or more isolation valves of the high pressure fluid conduit assembly are operationally configured to seal off one or more sections of one or more primary lines of the high pressure fluid conduit assembly.

11. The manifold system of claim 1 including a second manifold sub-assembly including a low pressure fluid conduit assembly for directing low pressure fluid to one or more target low pressure fluid destinations and a high pressure fluid conduit assembly for receiving high pressure fluid from one or more sources of high pressure fluid, wherein the low pressure fluid conduit assembly is fluidly communicated with the low pressure fluid conduit assembly of the first manifold sub-assembly and wherein the high pressure fluid conduit assembly is fluidly communicated with the high pressure fluid conduit assembly of the first manifold sub-assembly.

12. A manifold system for hydraulic fracturing operations at a well site including:
one or more manifold sub-assemblies, each manifold sub-assembly having a particular pump count, wherein one or more manifold sub-assemblies may be provided having a total pump count equal to a total number of hydraulic fracturing pumps at the well site.

13. The manifold system of claim 12 wherein the manifold system includes two or more manifold sub-assemblies in operable communication having a total pump count equal to the total number of hydraulic fracturing pumps.

14. The manifold system of claim 13 wherein at least two manifold sub-assemblies have differing pump counts.

15. The manifold system of claim 12 wherein the one or more manifold sub-assemblies have a total pump count at least equal to the total number of hydraulic fracturing pumps.

16. The manifold system of claim 12 wherein the pump count for a particular manifold sub-assembly may range from a two pump count sub-assembly to an eight pump count sub-assembly.

17. The manifold system of claim 12 wherein each of the one or more manifold sub-assemblies includes a low pressure fluid conduit assembly for directing low pressure fluid to the hydraulic fracturing pumps and a high pressure fluid conduit assembly for receiving high pressure fluid from the hydraulic fracturing pumps, the low pressure fluid conduit assembly having two or more primary flow lines in fluid communication and one or more diverting and isolation valves operationally configured to control the flow of fluid between the primary flow lines of the low pressure fluid conduit assembly, the high pressure fluid conduit assembly having two or more primary flow lines in fluid communication, one or more diverting and isolation valves operationally configured to control the flow of fluid between the primary flow lines of the high pressure fluid conduit assembly and a dedicated high pressure bypass line.

18. The manifold system of claim 17 wherein each low pressure fluid conduit assembly of the one or more manifold sub-assemblies includes one or more isolation valves operationally configured to control the flow of fluid through the low pressure fluid conduit assembly and one or more high pressure check valves operationally configured to prevent the flow of high pressure fluid into the low pressure fluid conduit assembly, wherein the high pressure fluid conduit assembly includes one or more isolation valves operationally configured to control the flow of fluid through the high pressure fluid conduit assembly, and wherein the one or more diverting and isolation valves and the one or more isolation valves of the low pressure fluid conduit assembly are operationally configured to seal off one or more sections of one or more primary lines of the low pressure fluid conduit assembly and wherein the one or more diverting and isolation valves and the one or more isolation valves of the high pressure fluid conduit assembly are operationally configured to seal off one or more sections of one or more primary lines of the high pressure fluid conduit assembly, wherein the one or more diverting and isolation valves and the one or more isolation valves of the manifold system are actuated remotely.

19. A method of delivering high pressure fluid to a well in hydraulic fracturing operations at a well site including:
providing one or more low pressure fluid sources;
providing a manifold system having one or more manifold sub-assemblies in operable communication, each manifold sub-assembly including (1) at least two primary low pressure fluid lines operationally configured to receive low pressure fluid into the manifold system and route low pressure fluid to one or more hydraulic fracturing pumps, the primary low pressure fluid lines including one or more diverting and isolation valves and one or more isolation valves that may be actuated remotely, and (2) at least two primary high pressure fluid lines operationally configured to receive high pressure fluid from the one or more hydraulic fracturing pumps and route the high pressure fluid to a well via at least one primary high pressure fluid line, the primary high pressure fluid lines including one or more diverting and isolation valves and one or more isolation valves that may be actuated remotely;
setting one or more one or more diverting and isolation valves and one or more isolation valves to an open position for routing high pressure fluid to the well via one or more primary high pressure fluid lines.

\* \* \* \* \*